US010206217B2

(12) United States Patent
Sawai

(10) Patent No.: US 10,206,217 B2
(45) Date of Patent: Feb. 12, 2019

(54) COMMUNICATION CONTROL DEVICE, COMMUNICATION CONTROL METHOD, BASE STATION, AND COMMUNICATION CONTROL SYSTEM

(71) Applicant: Sony Corporation, Tokyo (JP)

(72) Inventor: Ryo Sawai, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/378,458

(22) PCT Filed: Dec. 26, 2012

(86) PCT No.: PCT/JP2012/083667
§ 371 (c)(1),
(2) Date: Aug. 13, 2014

(87) PCT Pub. No.: WO2013/125150
PCT Pub. Date: Aug. 29, 2013

(65) Prior Publication Data
US 2015/0045049 A1 Feb. 12, 2015

(30) Foreign Application Priority Data
Feb. 20, 2012 (JP) ................. 2012-033853

(51) Int. Cl.
*H04W 72/08* (2009.01)
*H04W 52/24* (2009.01)
(Continued)

(52) U.S. Cl.
CPC ....... *H04W 72/082* (2013.01); *H04J 11/0056* (2013.01); *H04W 16/10* (2013.01);
(Continued)

(58) Field of Classification Search
CPC . H04W 72/082; H04W 16/32; H04W 52/244; H04W 24/02; H04W 72/0426; H04W 88/08; H04W 92/20; H04W 16/06
(Continued)

(56) References Cited

U.S. PATENT DOCUMENTS 8,301,153 B2 10/2012 Jang
8,385,452 B2 2/2013 Gorokhov
(Continued)

FOREIGN PATENT DOCUMENTS

JP 2011-211368 A 10/2011
JP 2011-211369 A 10/2011
(Continued)

OTHER PUBLICATIONS

International Search Report from International Publication PCT/JP/2012/083667 dated Mar. 5, 2013.
(Continued)

Primary Examiner — Kabir A Timory
(74) Attorney, Agent, or Firm — Chip Law Group

(57) ABSTRACT

Provided is a communication control device including a performance acquisition unit that acquires a parameter indicating communication performance on a signaling path of a base station of a small cell that at least partially overlaps with a macro cell in a wireless communication system, a selection unit that selects an interference control scheme for controlling interference between the macro cell and the small cell, based on the parameter acquired by the performance acquisition unit, and an interference control unit that transmits an interference control signal to the base station of the small cell in accordance with the interference control scheme selected by the selection unit.

14 Claims, 19 Drawing Sheets

(51) Int. Cl.
*H04W 24/02* (2009.01)
*H04J 11/00* (2006.01)
*H04W 16/10* (2009.01)
*H04W 16/32* (2009.01)
*H04W 16/28* (2009.01)

(52) U.S. Cl.
CPC ......... *H04W 24/02* (2013.01); *H04W 52/244* (2013.01); *H04W 16/28* (2013.01); *H04W 16/32* (2013.01)

(58) Field of Classification Search
USPC ...................................................... 455/452.1
See application file for complete search history.

(56) References Cited

U.S. PATENT DOCUMENTS

| | | | |
|---|---|---|---|
| 2010/0227603 A1* | 9/2010 | Gupta | H04W 24/02 455/418 |
| 2011/0098055 A1 | 4/2011 | Kwon et al. | |
| 2011/0269493 A1* | 11/2011 | Zhu | H04L 5/003 455/509 |
| 2011/0305293 A1* | 12/2011 | Choi et al. | 375/285 |
| 2011/0317742 A1 | 12/2011 | Kawahatsu et al. | |
| 2012/0202558 A1* | 8/2012 | Hedberg et al. | 455/550.1 |
| 2012/0309292 A1 | 12/2012 | Sawai | |
| 2012/0315936 A1 | 12/2012 | Sawai et al. | |
| 2012/0322388 A1 | 12/2012 | Sawai | |

FOREIGN PATENT DOCUMENTS

| | | |
|---|---|---|
| WO | 2010/048513 A2 | 4/2010 |
| WO | 2010/131841 A2 | 11/2010 |
| WO | 2011/118248 A1 | 9/2011 |
| WO | 2011150250 A1 | 12/2011 |
| WO | 2012046973 A1 | 4/2012 |

OTHER PUBLICATIONS

Extended European Search Report dated Sep. 17, 2015 in patent application No. 12869458.5.
Office Action Received for Japanese Patent Application No. 2014-500885, dated Feb. 23, 2016, 12 pages of Office Action Including 6 pages of English Translation.

* cited by examiner

⟵⟶ : SIGNALING PATH

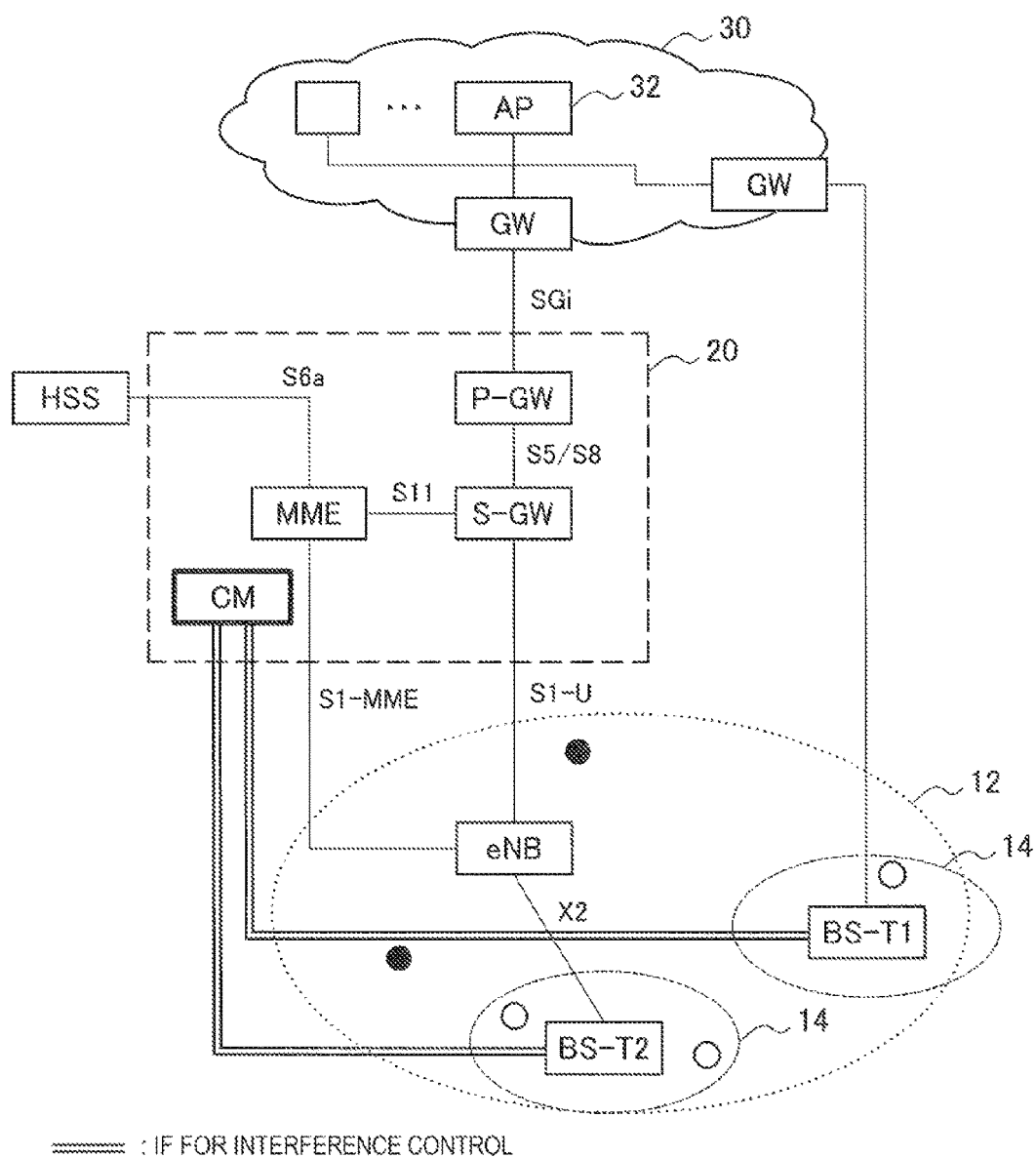

COMMUNICATION CONTROL DEVICE, COMMUNICATION CONTROL METHOD, BASE STATION, AND COMMUNICATION CONTROL SYSTEM

CROSS-REFERENCE TO RELATED APPLICATION

The present application is a national phase entry under 35 U.S.C. § 371 of International Application No. PCT/JP2012/083667 filed Dec. 26, 2012, published on Aug. 29, 2013 as WO 2013/125150 A1, which claims priority from Japanese Patent Application No. JP 2012-033853, filed in the Japanese Patent Office on Feb. 20, 2012.

TECHNICAL FIELD

The present disclosure relates to a communication control device, a communication control method, a base station, and a communication control system.

BACKGROUND ART

Recently, a high-speed cellular wireless communication scheme such as LTE (Long Term Evolution) and WiMAX has been used practically, which has significantly improved a communication rate of wireless communication service received by mobile users. Moreover, when a fourth-generation cellular wireless communication scheme such as LTE-A (LTE-Advanced) is introduced, it is expected that the communication rate further improves.

In addition, the number of mobile users is increasing rapidly, and an application requiring a high data rate is being used more widely. As a result, the progress of the cellular wireless communication scheme has not satisfied all needs of mobile users. Thus, the introduction of small cells is promoted in order to complement macro cells and increase communication capacity. The small cell is a concept including a femtocell, a nanocell, a picocell, and a micro cell, for example. The small cell is typically introduced by arranging a base station (also referred to as an access point) smaller than a base station of a macro cell (eNB (evolved Node B) in LTE, for example). However, in an area where a macro cell and a small cell overlap, there occurs a risk that radio signals transmitted and received by the small cell will cause interference to terminals connected to the macro cell.

In order to avoid the risk of interference with introduction of a small cell, the following Patent Literature 1 proposes a method of cooperatively controlling transmission power and transmission rates of a macro cell and a small cell. The following Patent Literature 2 proposes a method of cooperatively controlling transmission beams of a macro and a small cell.

CITATION LIST

Patent Literature

Patent Literature 1: JP 2011-211369A
Patent Literature 2: JP 2011-211368A

SUMMARY OF INVENTION

Technical Problem

However, to achieve cooperative interference control between a macro cell and a small cell, high-speed and low-latency signaling between base stations of such cells is required. For example, to effectively operate the method proposed in Patent Document 1 or 2 described above, it is considered that the latency not exceeding several radio frames, that is, several 10 msec is desirable. However, there may be actually a case in which the above-described desirable communication performance cannot be obtained for interference control, depending on a form of a small cell or arrangement of an interference control function.

Therefore, it is desirable to provide a mechanism allowing flexible switching between interference control schemes for controlling interference between a macro cell and a small cell.

Solution to Problem

According to the present disclosure, there is provided a communication control device including a performance acquisition unit that acquires a parameter indicating communication performance on a signaling path of a base station of a small cell that at least partially overlaps with a macro cell in a wireless communication system, a selection unit that selects an interference control scheme for controlling interference between the macro cell and the small cell, based on the parameter acquired by the performance acquisition unit, and an interference control unit that transmits an interference control signal to the base station of the small cell in accordance with the interference control scheme selected by the selection unit.

According to the present disclosure, there is provided a communication control method including, by a control node in a wireless communication system, acquiring a parameter indicating communication performance on a signaling path of a base station of a small cell that at least partially overlaps with a macro cell, selecting an interference control scheme for controlling interference between the macro cell and the small cell, based on the acquired parameter, and transmitting an interference control signal to the base station of the small cell in accordance with the selected interference control scheme.

According to the present disclosure, there is provided a base station of a small cell that at least partially overlaps with a macro cell in a wireless communication system, the base station including a communication unit that receives, from a control node controlling interference between the macro cell and the small cell, an interference control signal of an interference control scheme selected based on a parameter indicating communication performance on a signaling path between the base station of the small cell and a base station of the macro cell, and a controller that controls wireless communication between the base station of the small cell and a terminal connected to the small cell in accordance with the interference control signal received by the communication unit.

According to the present disclosure, there is provided a communication control system including a base station of a small cell that at least partially overlaps with a macro cell in a wireless communication system, and a control node including a performance acquisition unit that acquires a parameter indicating communication performance on a signaling path of the base station of the small cell, a selection unit that selects an interference control scheme for controlling interference between the macro cell and the small cell, based on the parameter acquired by the performance acquisition unit, and an interference control unit that transmits an interference control signal to the base station of the small cell in accordance with the interference control scheme selected by the selection unit.

Advantageous Effects of Invention

The technique according to the disclosure enables flexible switching between interference control schemes for controlling interference between a micro cell and a small cell.

BRIEF DESCRIPTION OF DRAWINGS

FIG. 10A is an explanatory diagram for explaining a first example of an interface for interference control.

DESCRIPTION OF EMBODIMENTS

Hereinafter, preferred embodiments of the present disclosure will be described in detail with reference to the appended drawings. Note that, in this specification and the drawings, elements that have substantially the same function and structure are denoted with the same reference signs, and repeated explanation is omitted.

Moreover, the explanation will be given in the following order.

1. System overview
1-1. Configuration of existing system
1-2. Arrangement of cooperation manager (CM)
1-3. Explanation of problem
2. First embodiment
2-1. Configuration example of cooperation manager
2-2. Configuration example of base station
2-3. Processing flow
3. Second embodiment
3-1. Deployment of interface for interference control
3-2. Configuration example of cooperation manager
3-3. Processing flow
4. Conclusion

1. SYSTEM OVERVIEW 1-1. Configuration of Existing System

First, an example of a configuration of an existing cellular wireless communication system will be described using FIG. 1 to FIG. 3. Note that a wireless communication system based on LTE (also referred to as E-UTRA (Evolved-UMTS Terrestrial Radio Access)) will be described here as an example of the existing system. However, the technique according to the disclosure is not limited to such an example, and can be widely applied to a wireless communication system based on various cellular wireless communication schemes such as W-CDMA, CDMA2000, WiMAX, and LTE-A.

Figure 1:
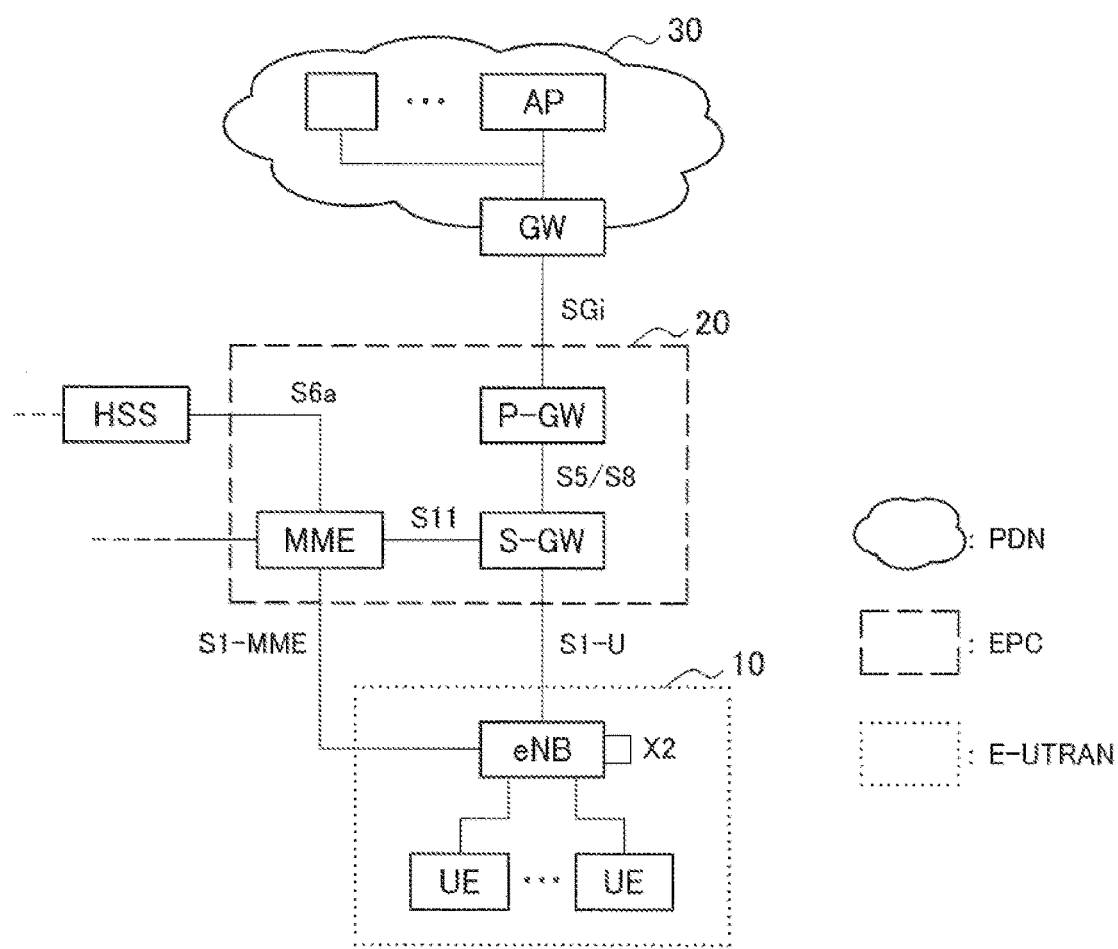
FIG. 1 is an explanatory diagram for explaining existing network architecture of an LTE-based wireless communication system.

FIG. 1 is an explanatory diagram for explaining existing network architecture of an LTE-based wireless communication system. With reference to FIG. 1, a wireless access network 10, a core network 20, and an external network 30 are illustrated. The wireless access network 10 is a network including a radio link between a user terminal (UE) and a base station (eNB), which is implemented as E-UTRAN (Evolved-UTRA Network), for example. The core network 20 is a network having various functions such as position registration, billing, and QoS (Quality of Service) management of a user terminal, which is implemented as EPC (Evolved Packet Core) including P-GW, S-GW, and MME, for example. The external network 30 is an IP (Internet Protocol) network also referred to as a PDN (Packet Data Network), and various application (AP) servers can be implemented on the external network 30.

Each node illustrated in FIG. 1 has the following function. Note that FIG. 1 illustrates only representative nodes in a wireless communication system, and other kinds of nodes can be also included in the wireless communication system.

HSS (Home Subscriber Server): Server managing identification information, profile information, and authentication information of subscriber, etc.

MME (Mobility Management Entity): Entity transmitting and receiving NAS (Non Access Stratum) signals to and from UE and performing mobility management, session control, and paging, etc. The MME is connected to a plurality of eNBs.

P-GW (PDN-Gateway): Gateway positioned at a connection point between the EPC and the PDN to perform allocation of IP addresses to UEs, provision and deletion of IP headers, etc. The P-GW may perform billing management.

S-GW (Serving-Gateway): Gateway positioned at a connection point between the E-UTRAN and the EPC to perform routing of a packet on a user plane. When an UE performs handover between eNBs or between UTRANs, the S-GW becomes an anchor point.

eNB (evolved Node B): Base station achieving a radio link in a macro cell. Perform radio resource management (RRM: Radio Resource Management), radio bearer control, and scheduling, etc.

UE (User Equipment): User terminal using wireless communication service provided by eNB.

Between the nodes illustrated in FIG. 1, the following logical interface can be formed using a GTP (GPRS Tunneling Protocol) tunnel, for example.

SGi: Interface between the P-GW and the PDN
S5/S8: Interface for mainly transmitting user packets between the S-GW and the P-GW
S11: Interface for mainly transmitting control signals for mobility management and session management between the S-GW and the MME.
S6a: Interface between the MME and the HSS
S1-U: Interface on a user plane between the eNB and the S-GW
S1-MME: Interface on a control plane between the eNB and the MME
X2: Interface on a user plane and a control plane between base stations Note that the details of these interfaces are mentioned in "Overall description; Stage (Release 11)" (3GPP TS 36.300 V11.0.0 (2011 December)).

Figure 2:
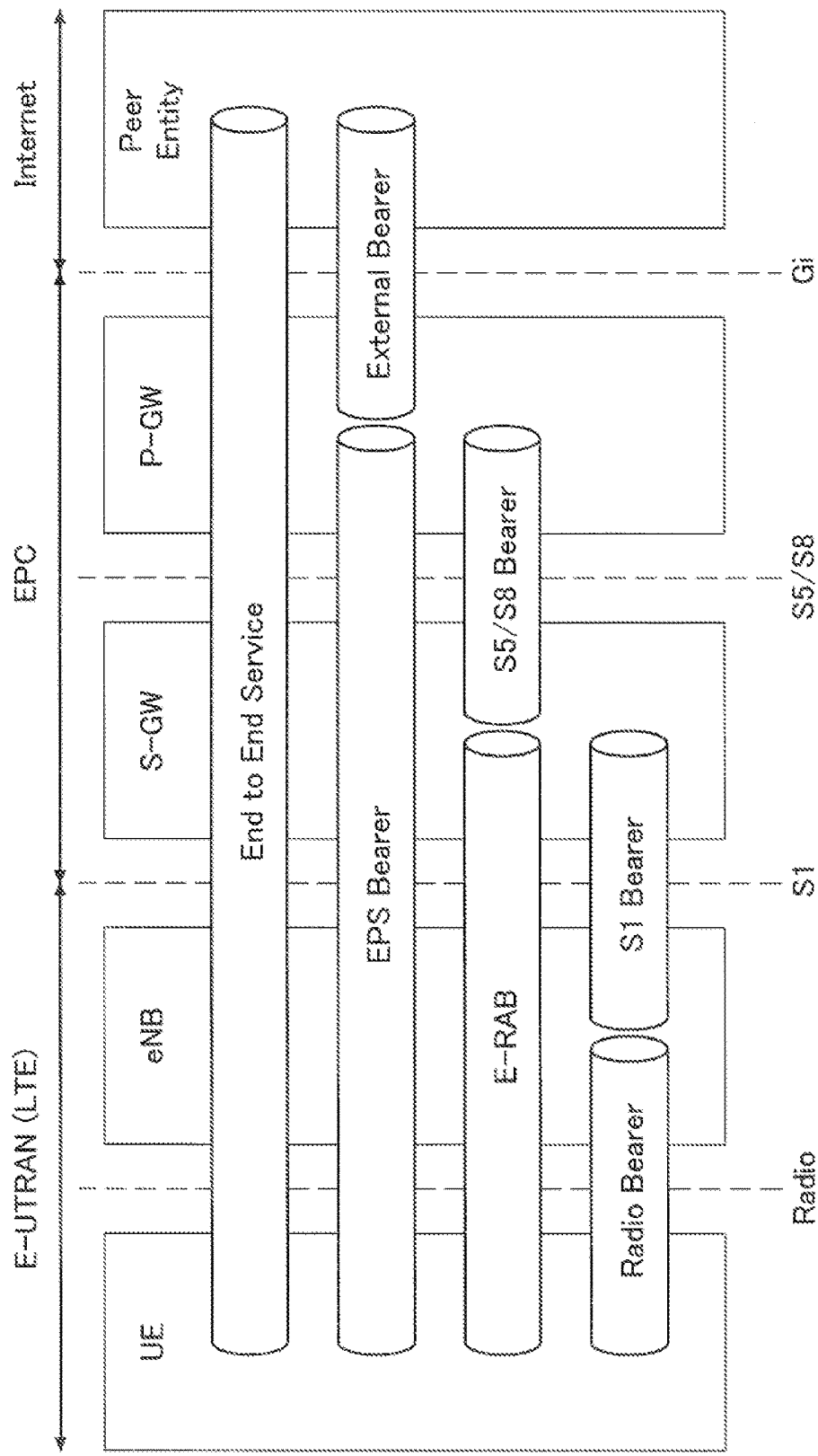
FIG. 2 is an explanatory diagram for explaining various bearers established on communication paths between nodes illustrated in FIG. 1.

FIG. 2 is an explanatory diagram for explaining various bearers established on communication paths between the nodes illustrated in FIG. 1. In the example of FIG. 2, an EPS (Evolved Packet System) bearer is established between the UE and the P-GW. The EPS bearer and an external bearer can constitute an end-to-end communication path. An E-RAB (EPS-Radio Access Bearer) is established between the UE and the S-GW. A radio bearer is established between the UE and the eNB. The radio bearer and an S1 bearer constitute the E-RAB. Moreover, the radio bearer, the S1 bearer, and an S5/S8 bearer constitute the EPS bearer. The identifier of the EPS bearer is allocated by the MME. The packet transmitted from the UE or received by the UE is transferred through these bearers.

The base station of a cellular wireless communication system represented by the eNB illustrated in FIG. 1 and FIG. 2 provides wireless communication service to terminals connected to the macro cell. The radius of a macro cell is generally several hundreds of meters to over ten kilometers. However, near the boundary between macro cells, behind buildings, and in space such as underground or indoor, the strength of radio signals from the base station of a macro cell is reduced, which can consequently cause a problem that the communication is disabled or the data rate is insufficient. In such a situation, the small cell can be introduced to complement the macro cell and increase communication capacity. The small cell is a concept including a femtocell, a nanocell, a picocell, and a micro cell, for example, and introduced by arranging various kinds of small and medium scale base stations, as described above. Table 1 exemplifies some kinds of base stations of a small cell.

TABLE 1

Kinds and characteristics of base station of small cell

| Kinds of base station | IF type | Access type | Assumed place |
|---|---|---|---|
| RRH (Remote Radio Head) | type-2 | open | outdoor |
| hot zone base station | type-2 | open | outdoor |
| femtocell base station | type-1 | closed | indoor |
| relay station | type-1 | open | outdoor |

In Table. 1, the "IF type" is classification regarding an interface with a base station of a macro cell. The RRH and hot zone base stations having an X2 interface with a base station of a macro cell can be categorized to type-2, and the femtocell base station and the relay station not having an X2 interface can be categorized to type-1. The "access type" is classification regarding acceptance of access from UEs. The access type of the RRH, the hot zone base station, and the relay station is open, and all user terminals can be connected to small cells of such base stations in principle. By contrast, the access type of the femtocell base station is closed, and only limited user terminals can be connected to the femtocells in principle.

Figure 3:
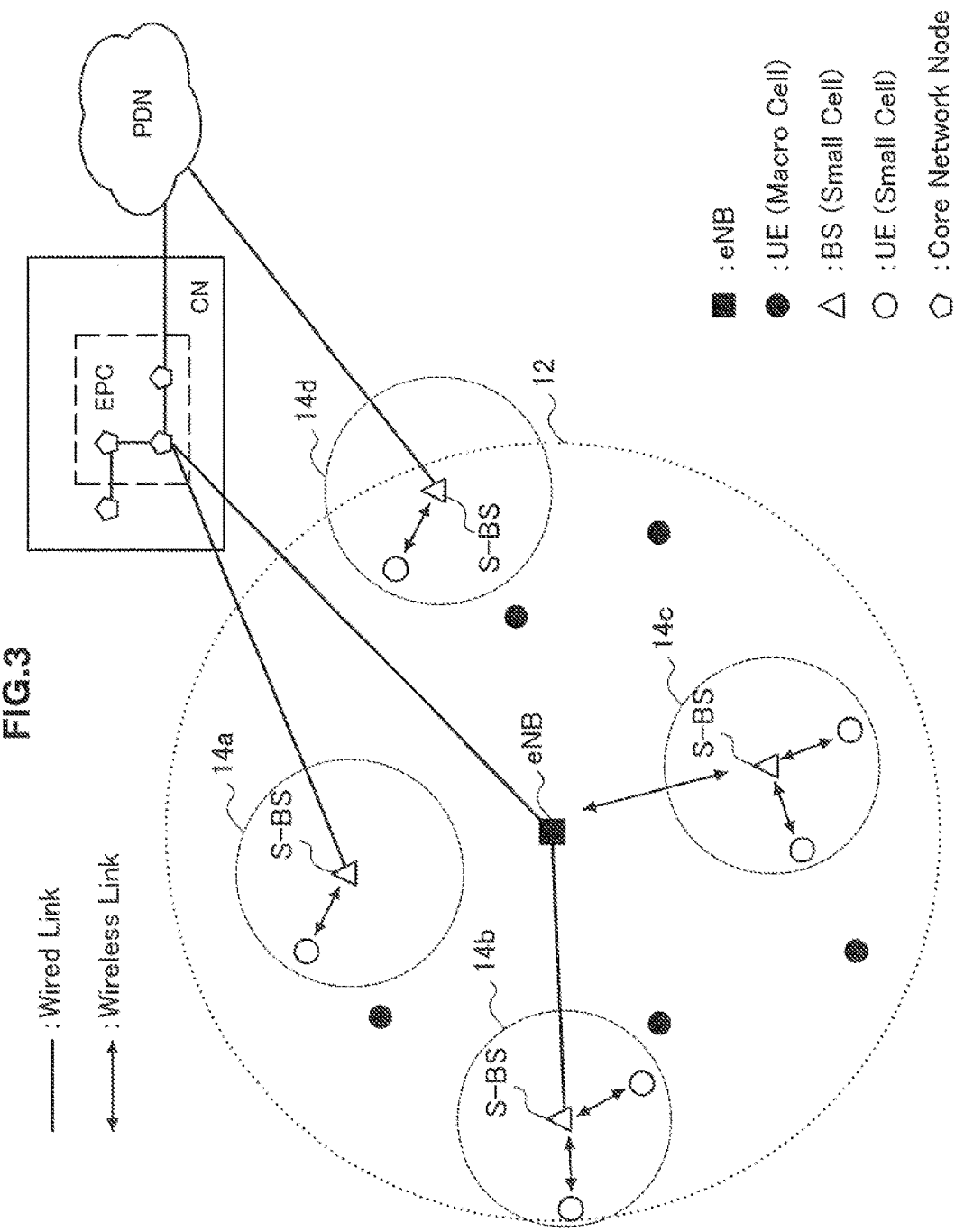
FIG. 3 is an explanatory diagram for explaining an example of arrangement of small cells.

FIG. 3 is an explanatory diagram for explaining an example of arrangement of small cells. With reference to FIG. 3, a macro cell 12 receiving service from a single base station (eNB) is illustrated. The base station of a macro cell is connected to a core network through a wired link. Moreover, FIG. 3 also illustrates four small cells 14a to 14d at least partially overlapping with the macro cell 12. The base station (S-BS) of the small cell 14a is connected to the core network through a wired link. The base station of the small cell 14b is connected to the base station of the macro cell through a wired link. The base station of the small cell 14c is connected to the base station of the macro cell through a radio link. The base station of the small cell 14d is connected to the core network through an external network (PDN).

When small cells are arranged in a macro cell in this manner, there occurs a risk that radio signals transmitted and received by the small cells will cause interference to terminals connected to the macro cell. In order to avoid such a risk, some interference control schemes can be used. The most simple interference control scheme may be separation of operating frequency band. However, under the situation in which frequency resources are depleted, the frequency band different from an operating frequency band of a macro cell cannot be necessarily allocated to a small cell. Therefore, the interference control scheme for cooperatively controlling transmission power or transmission rates of a macro cell and a small cell, which is proposed in Patent Literature 1 described above, or the interference control scheme for cooperatively controlling transmission and reception beams of a macro cell and a small cell, which is proposed in Patent Literature 2 described above, is also effective. The cooperation manager (CM: Cooperation Manager) is a function entity introduced to achieve such cooperative control between a macro cell and a small cell.

1-2. Arrangement of Cooperation Manager (CM)

The cooperation manager may be arranged on any of communication nodes capable of communication with a base station of a small cell. FIG. 4A to FIG. 4E illustrate some typical examples of arrangement of the cooperation manager.

Figure 4A:
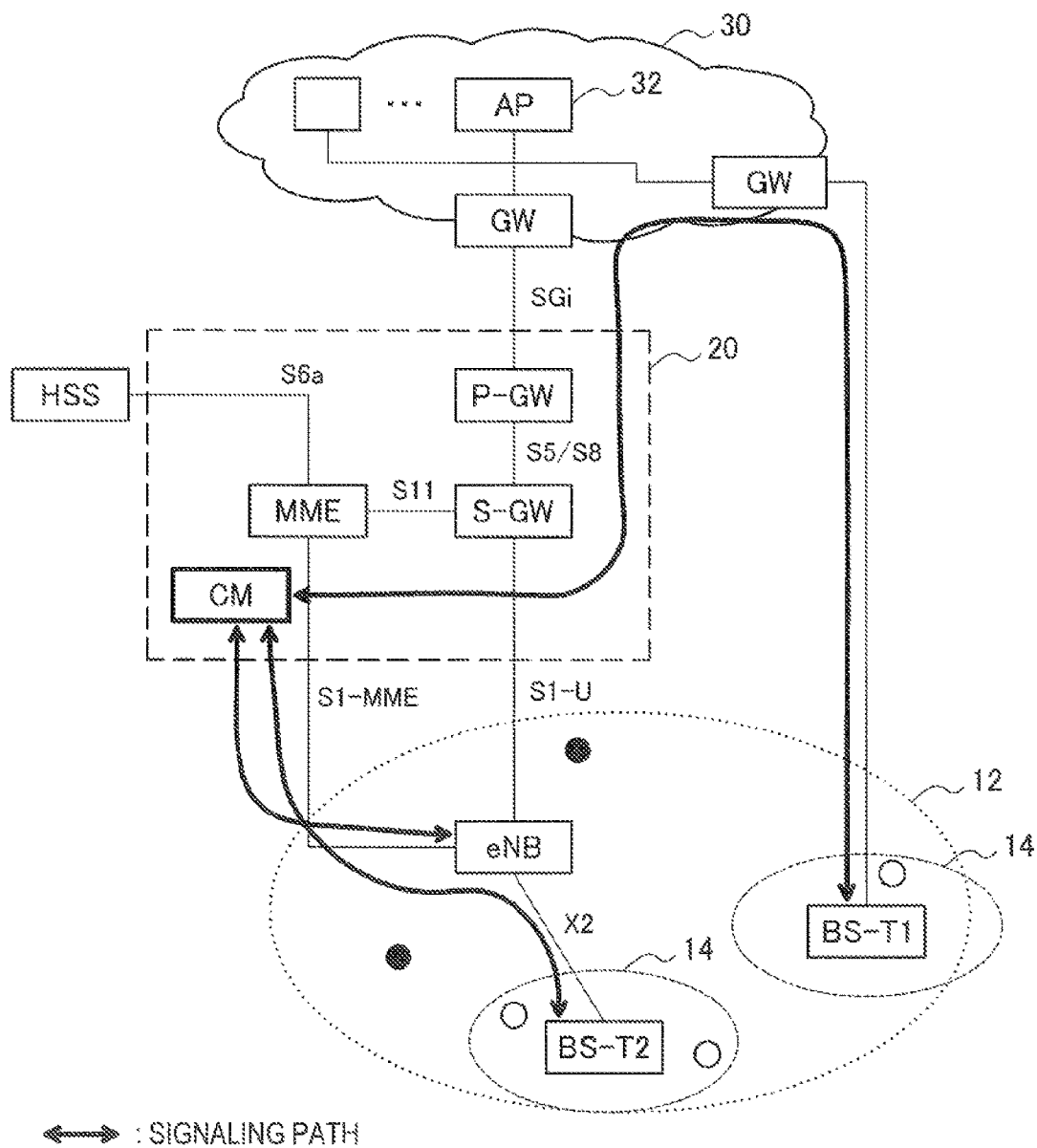
FIG. 4A is an explanatory diagram illustrating a first example of arrangement of a cooperation manager for interface control.
Figure 4B:
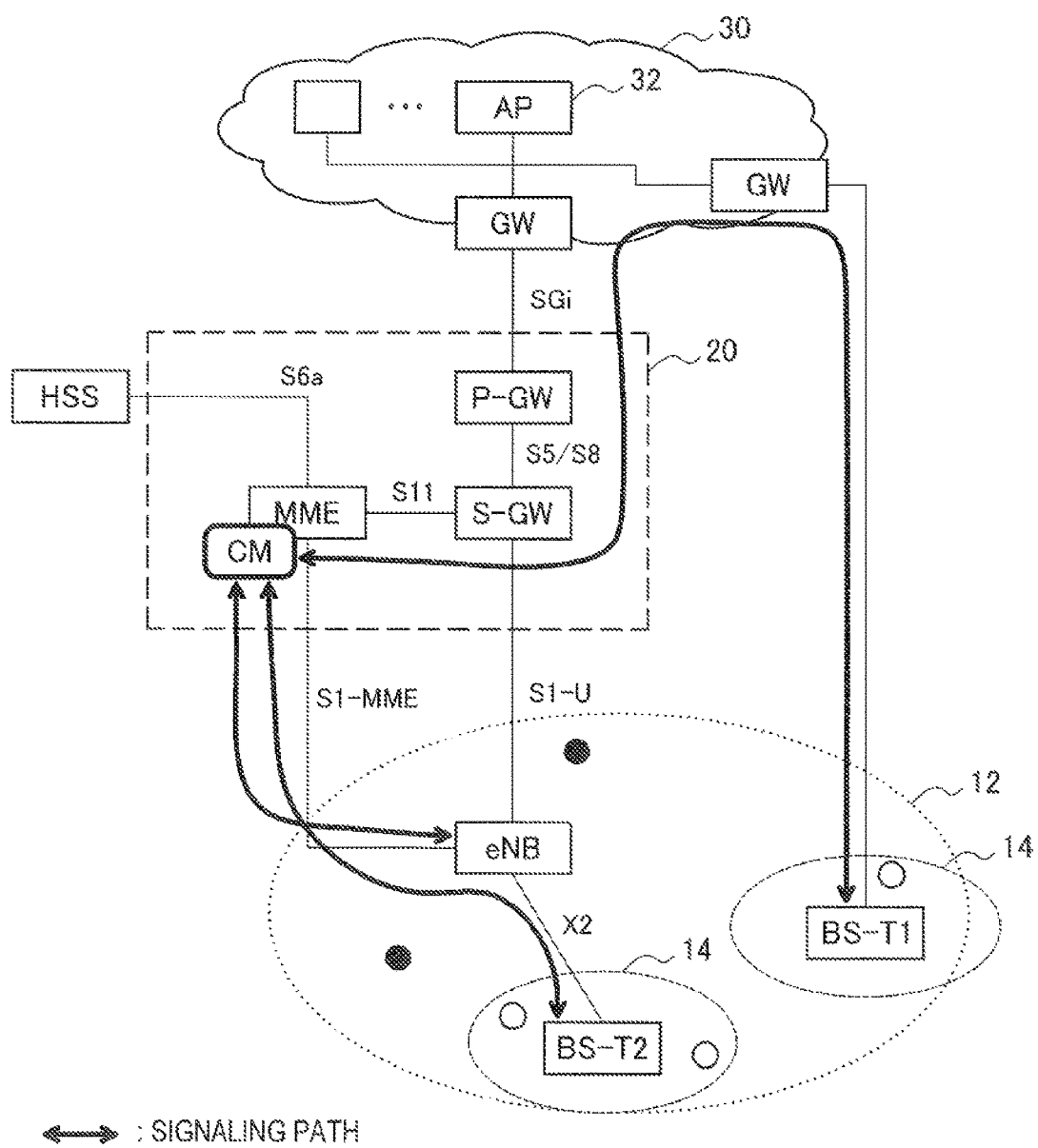
FIG. 4B is an explanatory diagram illustrating a second example of arrangement of the cooperation manager for interface control.

In the example of FIG. 4A, the cooperation manager (CM) is arranged as a new control node in the core network 20. In this case, signaling between the cooperation manager and a type-1 base station of a small cell can be performed through the external network 30. By contrast, signaling between the cooperation manager and a type-2 base station of a small cell can be performed through the base station (eNB) of a macro cell.

In the example of FIG. 4, the cooperation manager (CM) is arranged as a new function on a control node (an MME, for example) in the core network 20. Also in this case, signaling between the cooperation manager and a type-1 base station of a small cell can be performed through the external network 30. By contrast, signaling between the cooperation manager and a type-2 base station of a small cell can be performed through the base station (eNB) of a macro cell.

Figure 4C:
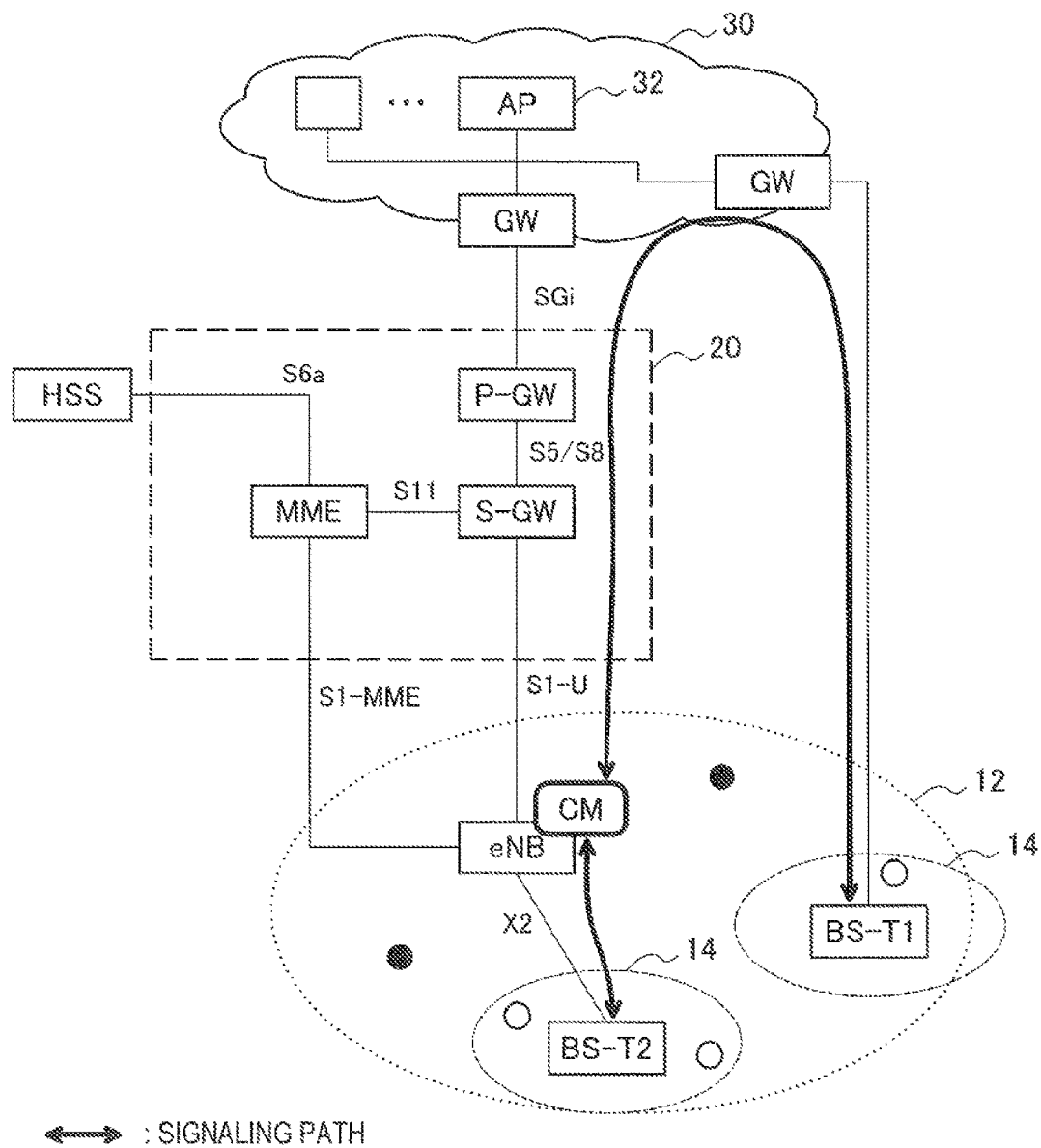
FIG. 4C is an explanatory diagram illustrating a third example of arrangement of the cooperation manager for interface control.

In the example of FIG. 4C, the cooperation manager (CM) is arranged as a new function on the base station (eNB) of a macro cell. In this case, signaling between the cooperation manager and a type-1 base station of a small cell can be performed through the core network 20 and the external network 30. By contrast, signaling between the cooperation manager and a type-2 base station of a small cell can be performed on an X2 interface.

Figure 4D:
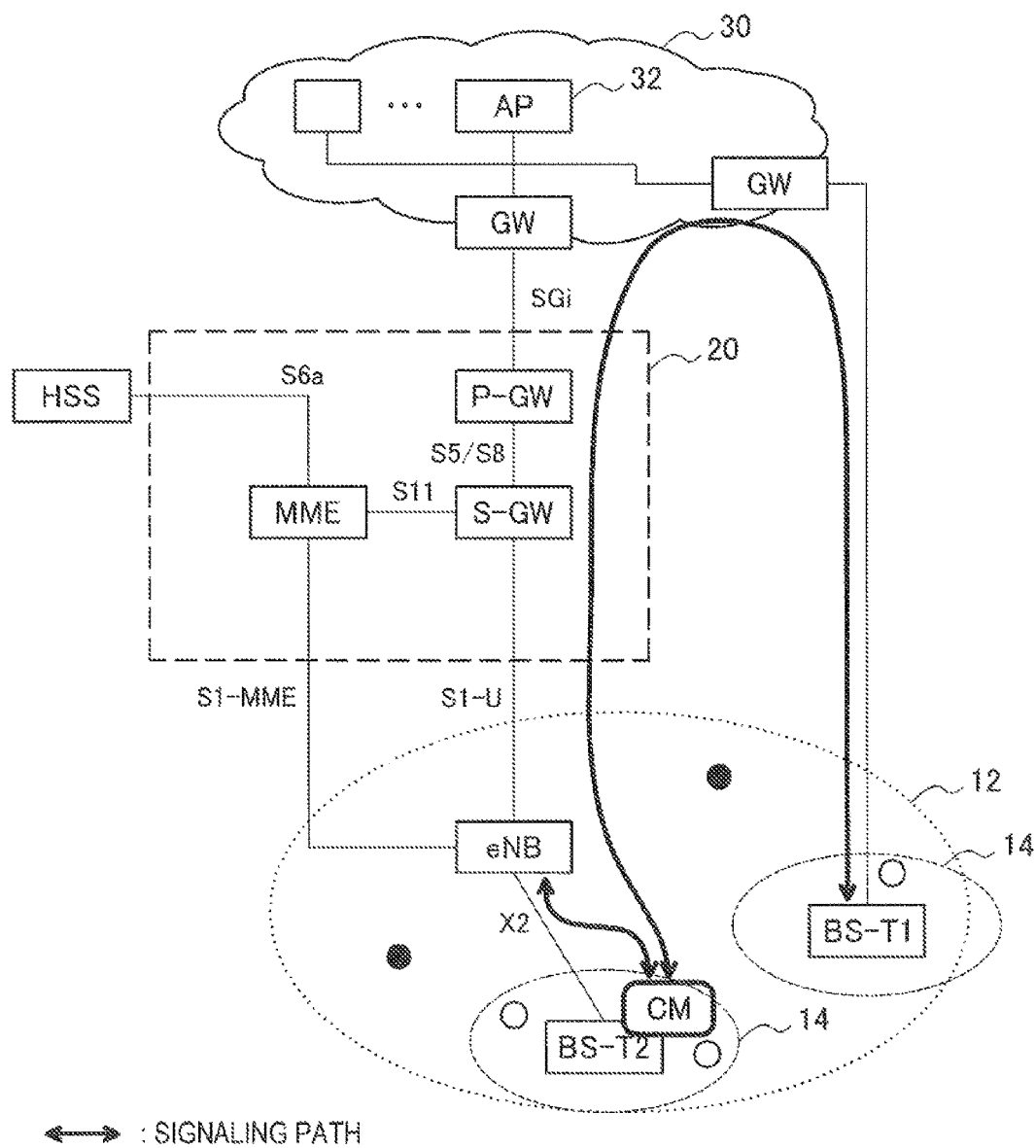
FIG. 4D is an explanatory diagram illustrating a fourth example of arrangement of the cooperation manager for interface control.
Figure 4E:
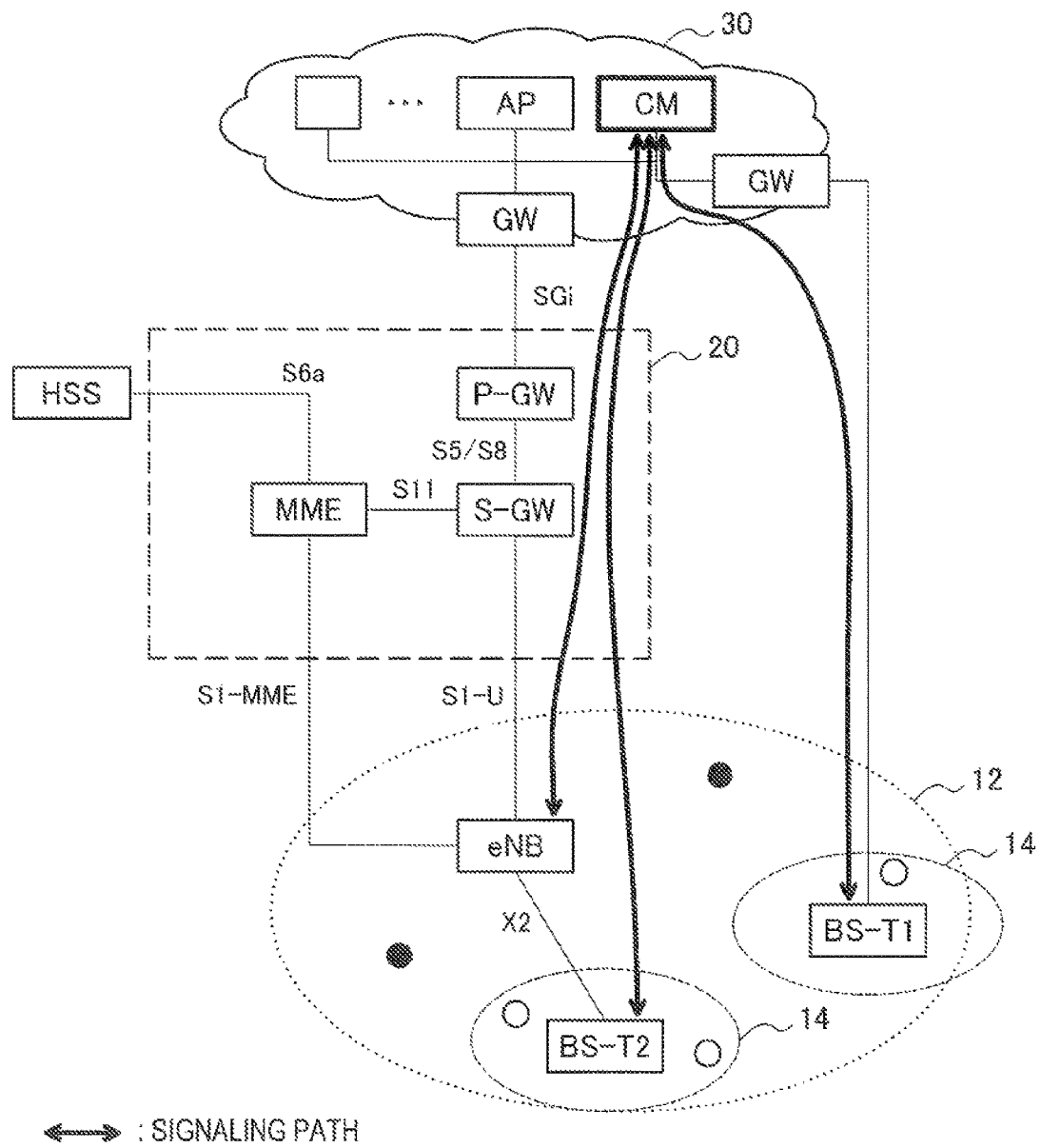
FIG. 4E is an explanatory diagram illustrating a fifth example of arrangement of the cooperation manager for interface control.

In the example of FIG. 4D, the cooperation manager (CM) is arranged as a new function on a base station of a small cell. In this case, signaling between the cooperation manager and a different type of another base station of a small cell can be performed through the wireless access network 10, the core network 20, and the external network 30. When the cooperation manager is arranged on a type-2 base station, signaling between the cooperation manager and the base station of a macro cell can be performed on an X2 interface.

In the example of FIG. 4, the cooperation manager (CM) is arranged as a new server device in the external network 30. In this case, signaling between the cooperation manager and a type-1 base station of a small cell can be performed through a communication link between the external network 30 and the type-1 base station. By contrast, signaling between the cooperation manager and a type-2 base station of a small cell can be performed through the core network 20.

Note that in any of FIG. 4A to FIG. 4E, the cooperation manager may be controlled by an application server of the IMS (IP Multimedia Subsystem). The application server controlling the cooperation manager is arranged in the external network 30, for example. Then, setting of the cooperation manager can be performed through the application server.

1-3. Explanation of Problem

In general, the scheme allowing closer cooperation between cells can suppress interference while using frequency sources more efficiently. However, high-speed and low-latency signaling is required for close cooperation. For example, to effectively operate the method proposed in Patent Literature 1 or 2 described above, it is considered that the latency not exceeding several radio frames, that is, several 10 msec is desirable. However, there may be actually a case in which the desirable communication performance cannot be obtained for interference control, depending on a form of a small cell or arrangement of the cooperation manager.

As understood from Table 1 and FIG. 3, there are various examples of the kinds of small cells and the forms of arrangement thereof. Even when the base station of a small cell has a wired link, the wired link is possibly a high speed link such as FTTH (Fiber To The Home), or the wired link is possibly a low speed link such as ISDN (Integrated Services Digital Network), depending on an area. Moreover, as understood from FIG. 4A to FIG. 4E, signaling paths for interference control also vary depending on arrangement of the cooperation manager.

Then, two embodiments to be described from the following section provide a mechanism for flexibly switching, for interference control, interference control schemes depending on actually obtained communication performance.

2. FIRST EMBODIMENT

2-1. Configuration Example of Cooperation Manager

Figure 5:
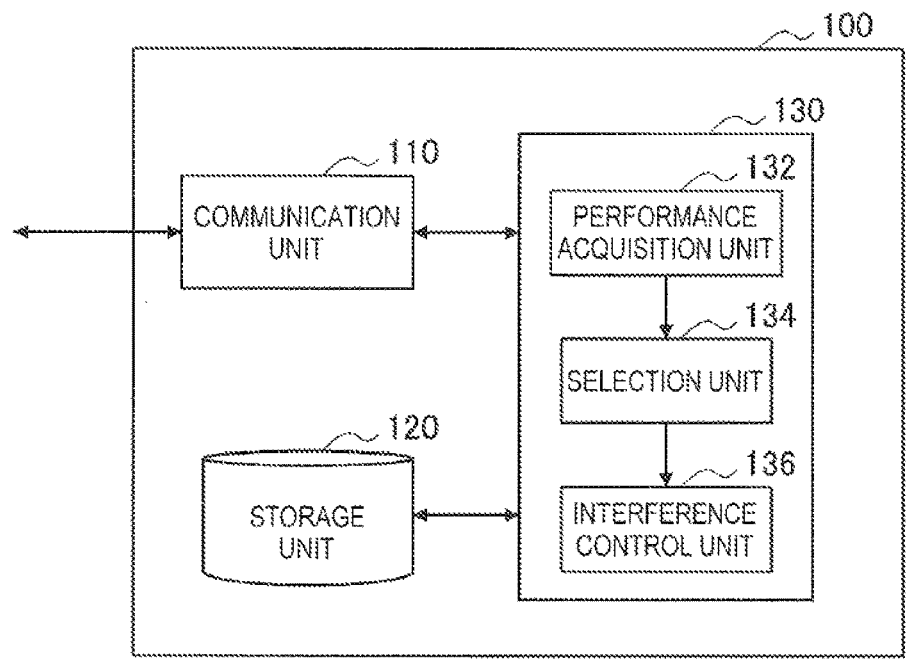
FIG. 5 is a block diagram illustrating an example of a configuration of the cooperation manager according to a first embodiment.

FIG. 5 is a block diagram illustrating an example of a configuration of a cooperation manager 100 according to a first embodiment. With reference to FIG. 5, the cooperation manager 100 includes a communication unit 110, a storage unit 120, and a controller 130.

(1) Communication Unit

The communication unit 110 is a communication module for communication of the cooperation manager 100 with other nodes. The communication unit 110 may include a wireless communication module including an antenna and an RF (Radio Frequency) circuit, or include a wired communication module such as a LAN (Local Area Network) connection terminal.

(2) Storage Unit

The storage unit 120 stores programs and data for operation of the cooperation manager 100, using a storing medium such as a hard disk or a semiconductor memory. For example, the storage 120 may store thresholds to be compared with communication performance parameters when a selection unit 124 described later selects an interference control scheme.

(3) Controller

The controller 130 corresponds to a processor such as a CPU (Central Processing Unit) or a DSP (Digital Signal Processor). The controller 130 operates various functions of the cooperation manager 100 by executing programs stored in the storage unit 120 or other storing media. In the embodiment, the controller 130 includes three function modules of a performance acquisition unit 132, a selection unit 134, and an interference control unit 136.

(3-1) Performance Acquisition Unit

The performance acquisition unit 132 acquires a communication performance parameter indicating communication performance on a signaling path of a base station of a small cell that is specified as a target of interference control. The communication performance parameter is a parameter typically indicating at least one of throughput and latency. When signaling for interference control is performed through the cooperation manager, the performance acquisition unit 132 itself may measure communication performance regarding the signaling. Alternatively, the performance acquisition unit 132 may request another control node such as a P-GW, an S-GW, or an eNB, for example, to measure communication performance. The communication performance may be measured by repeatedly transmitting and receiving test signals (ping signals, for example) a plurality of number of times, or measured based on the statistics of actual traffic, for example.

The communication performance can be measured between different nodes in accordance with the kind of a base station of a small cell. When the base station of a small cell is a type-2 base station, for example, the base station has an X2 interface, and thus can perform signaling without an external network interposed. In such a case, the communication performance is measured with respect to at least one bearer constituting the EPS bearer exemplified in FIG. 2. Which bearer is measured regarding communication performance depends on arrangement of the cooperation manager. By contrast, when the base station of a small cell is a type-1 base station, the base station does not have an X2 interface, and thus signaling is normally performed through an external network. In such a case, the communication performance is measured in an end-to-end manner (between the base station of a small cell and the cooperation manager or between the base station of a small cell and the base station of a macro cell, for example).

The performance acquisition unit 132 outputs the communication performance parameter indicating communication performance measured in this manner to the selection unit 134.

(3-2) Selection Unit

The selection unit 134 selects an interference control scheme for controlling interference of radio signals between a macro cell and a small cell, based on the communication performance parameter acquired by the performance acquisition unit 132. The candidate for an interference control scheme that can be selected by the selection unit 134 may be two or more arbitrary interference control schemes each having a different signaling overhead amount or resistance to latency. For example, as the first standard, when the communication performance parameter indicates that communication performance (throughput, for example) is higher, the selection unit 134 can select an interference control scheme requiring larger signaling overhead. Moreover, as the second standard, when the communication performance parameter indicates that communication performance is lower (high latency, for example), the selection unit 134 can select an interference control scheme having higher resistance to latency. These standards may be used individually or in combination.

As an example, a first interference control scheme that can be selected by the selection unit 134 is a frequency band separation scheme. In the first interference control scheme, the macro cell and the small cell are provided respectively with operating frequency bands different from each other. When frequency resources are sufficiently available, and operating frequency bands can be allocated in a quasi-static manner (that is, in a fixed manner with a span of several hundreds of msec or longer), it is possible to suppress overhead of signaling in the first interference control scheme to significantly small. In addition, even when the latency of signaling is relatively high, the first interference control scheme can operate effectively.

A second interference control scheme that can be selected by the selection unit 134 is a power/rate adjustment scheme. In the second interference control scheme, transmission power or transmission rates are adjusted between a macro cell and a small cell. Regarding the details of the second interference control scheme, it is suggested to refer to Patent Literature 1 described above. In the second interference control scheme, signaling of control data such as a transmission power value, an allowed interference amount, and an assumed interference amount is performed. The data amount of control data can depend on the number of user links, the number of resource blocks for each channel, and the number of channels, for example, in addition to the number of bits of a transmission power value, an allowed interference amount, and an assumed interference amount. As compared with the first interference control scheme, higher throughput and lower latency on signaling paths are requested in the second interference control scheme.

A third interference control scheme that can be selected by the selection unit 134 is a beam adjustment scheme. In the third interference control scheme, transmission beams or reception beams are adjusted between a macro cell and a small cell. Regarding the details of the third interference control scheme, it is suggested to refer to Patent Literature 2 described above. In the third interference control scheme, signaling of control data such as a beam steering matrix, an allowed interference amount, and an assumed interference amount is performed. The data amount of control data can depend on the number of user links, the number of resource blocks for each channel, and the number of channels, for example, in addition to the number of bits of a beam steering matrix, an allowed interference amount, and an assumed interference amount. Moreover, the data size of a beam steering matrix becomes larger as the number of transmission and reception antennas is increased. As compared with the second interference control scheme, higher throughput and same or lower latency on signaling paths are requested in the third interference control scheme.

Note that the interference control scheme is not limited to these examples, and another interference control scheme may be selected. Moreover, it is possible to select an interference control scheme using the combination of two or more of the above-described first to third interference control schemes.

When the selection unit 134 selects an interference control scheme based on the communication performance parameter, it outputs an identifier identifying the selected scheme to the interference control unit 136.

(3-3) Interference Control Unit

The interference control unit 136 cooperatively controls interference between a macro cell and a small cell in accordance with the interference control scheme selected by the selection unit 134. When the selection unit 134 selects the first interference control scheme, for example, the interference control unit 136 transmits interference control signals specifying, as an operating frequency band, a frequency band different from a frequency band allocated to the macro cell, to the base station of the small cell. Moreover, when the selection unit 134 selects the second interference control scheme, for example, the interference control unit 136 transmits, to the base station of the macro cell and the base station of the small cell, interference control signals instructing them to mutually adjust transmission power and transmission rates in accordance with the method described in Patent Literature 1. Furthermore, when the selection unit 134 selects the third interference control scheme, for example, the interference control unit 136 transmits, to the base station of the macro cell and the base station of the small cell, interference control signals instructing them to mutually adjust transmission beams and reception beams in accordance with the method described in Patent Literature 2. As a result, it is possible to suppress interference between the macro cell and the small cell.

The acquisition of a communication performance parameter by the performance acquisition unit 132, and the selection of an interference control scheme by the selection unit 134 may be repeated periodically in a fixed cycle. Alternatively, in response to a request from a base station or a user terminal having detected interference exceeding a given level, the performance acquisition unit 132 may acquire a communication performance parameter, and the selection unit 134 may select an interference control scheme.

2-2. Configuration Example of Base Station

Figure 6:
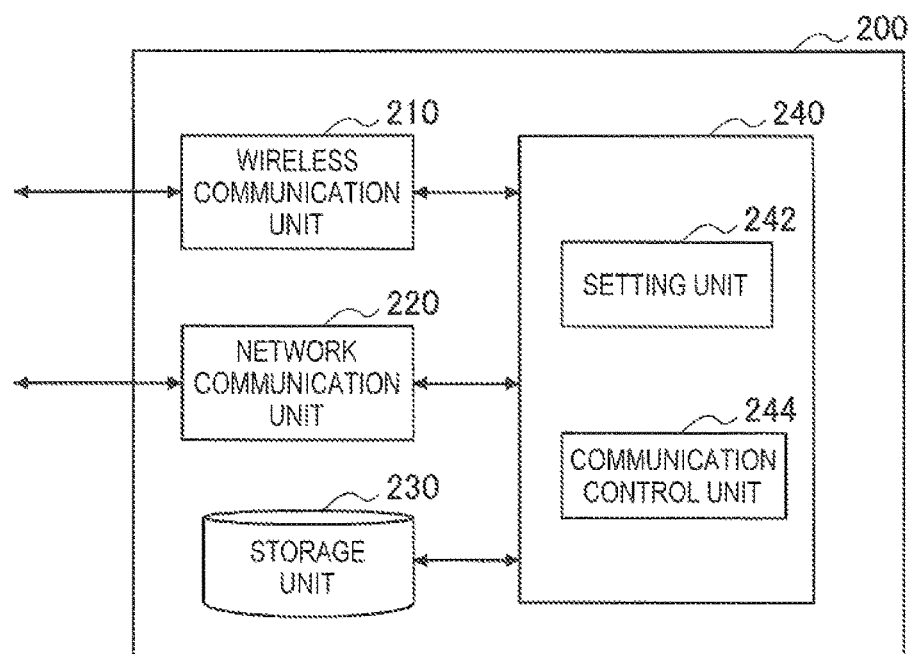
FIG. 6 is a block diagram illustrating an example of a configuration of a base station according to the first embodiment.

A base station 200 of a small cell constitutes a communication control system together with the cooperation manager 100 described above. FIG. 6 is a block diagram illustrating an example of a configuration of the base station 200 of a small cell according to the first embodiment. With reference to FIG. 6, the base station 200 includes a wireless communication unit 210, a network communication unit 220, a storage unit 230, and a controller 240.

(1) Wireless Communication Unit

The wireless communication unit 210 is a wireless communication module for providing wireless communication service to terminals connected to the small cell. The wireless communication unit 210 includes an antenna and an RF circuit. The transmission power of radio signals transmitted from the wireless communication unit 210 can be controlled such that interference caused to a macro cell is suppressed within an allowed range. Moreover, the wireless communication unit 210 typically includes a plurality of antennas, and can direct transmission beams and reception beams to a direction identified by a beam steering matrix (or precoding matrix).

(2) Network Communication Unit

The network communication unit 220 is a communication module for communication between the base station 200 of a small cell and a control node such as a cooperation manager. The network communication unit 220 may include a wireless communication module that can be made common with the wireless communication unit 210, or may include a wired communication module such as a LAN connection terminal.

(3) Storage Unit

The storage unit 230 stores programs and data for operation of the base station 200, using a storing medium such as a hard disk or a semiconductor memory. For example, the storage unit 230 can store transmission power values, transmission rates, or beam steering matrices, for example, that are specified by the cooperation manager or adjusted between the base station of the small cell and a base station of a macro cell, for example.

(4) Controller

The controller 240 corresponds to a processor such as a CPU or a DSP. The control unit 240 operates various functions of the base station 200 by executing programs stored in the storage unit 230 or other storing media. In the embodiment, the controller 240 includes two function modules of a setting unit 242, and a communication control unit 244.

(4-1) Setting Unit

The setting unit 242 sets a communication parameter for wireless communication with terminals connected to the small cell in accordance with interference control signals received by the network communication unit 220. When the interference control is started, the cooperation manager specifies any of interference control schemes. The subsequent interference control may be performed through the cooperation manager, or performed directly between the base station of a small cell and a base station of a macro cell. For example, when the first interference control scheme is specified, the setting unit 242 sets an operating frequency band of the wireless communication unit 210 to a frequency band different from an operating frequency band of the macro cell. Moreover, when the second interference control scheme is specified, the setting unit 242 sets transmission power or a transmission rate of the wireless communication unit 210 to a value adjusted so that the interference caused to the macro cell is suppressed within an allowed range. Moreover, when the third interference control scheme is specified, the setting unit 242 sets a direction of transmission beams or reception beams of the wireless communication unit 210 using a specified beam steering matrix.

(4-2) Communication Control Unit

The communication control unit 244 controls wireless communication with terminals connected to the small cell. For example, the communication control unit 244 allocates frequency resources within a range of operating frequency band set by the setting unit 242, to each terminal, and delivers scheduling information in the small cell. Then, the communication control unit 244 controls the wireless communication unit 210 to receive up-link signals and transmit down-link signals in accordance with the allocation of frequency resources. Moreover, the communication control unit 244 can also control transmission power, a transmission rate, or directivity of transmission beams or reception beams of each terminal connected to the small cell in accordance with interference control signals received by the network communication unit 220.

2-3. Processing Flow (1) Entire Flow

Figure 7:
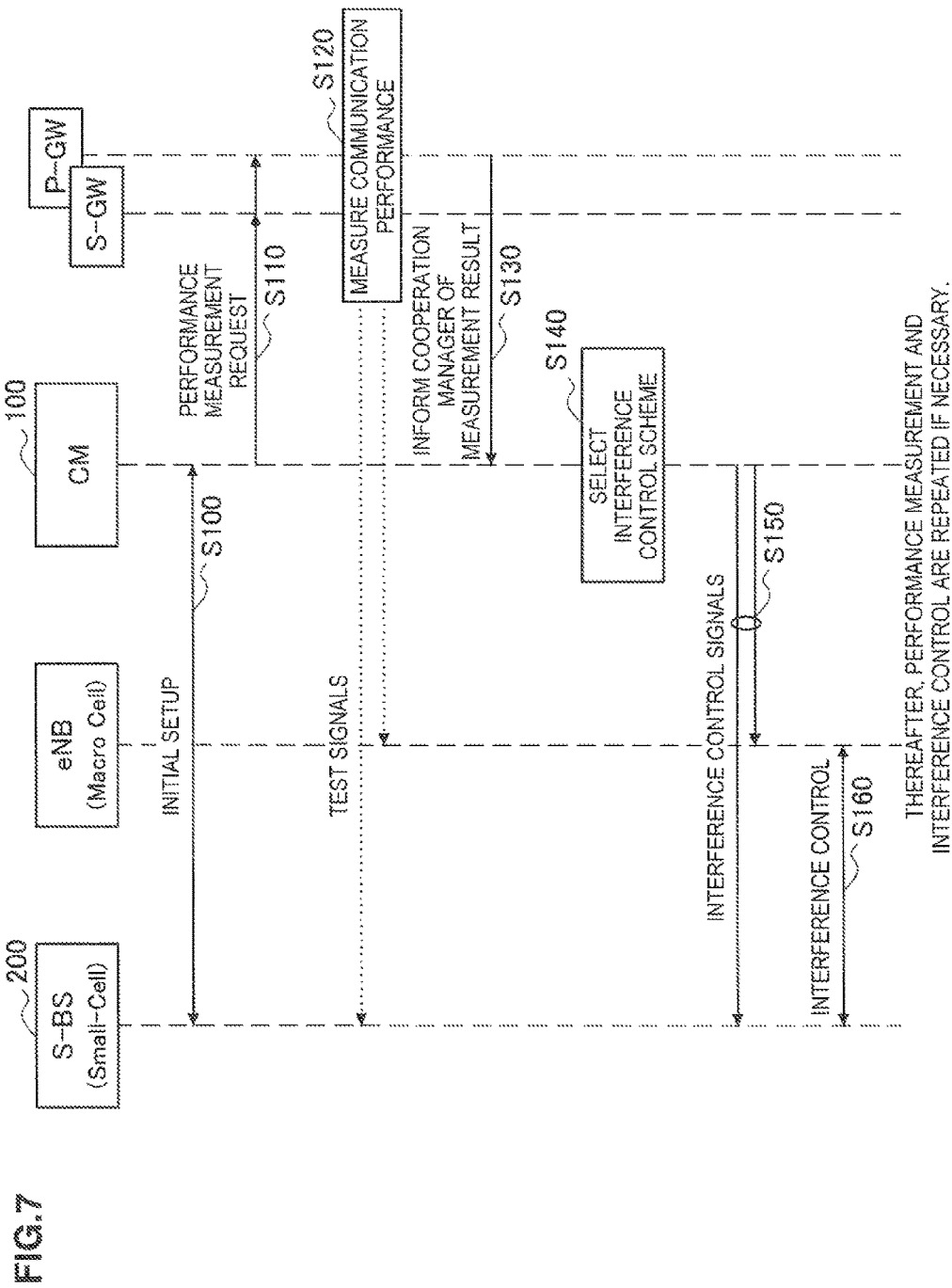
FIG. 7 is a sequence diagram illustrating an example of a flow of communication control processing according to the first embodiment.

FIG. 7 is a sequence diagram illustrating an example of a flow of communication control processing according to the first embodiment.

The communication control processing exemplified in FIG. 7 is started with initial setup at Step S100. In the initial setup, the base station 200 of a small cell is arranged in a macro cell, and the communication connection is typically established after authentication processing between one cooperation manager (CM) 100 and the base station 200 of the small cell.

Once the initial setup is completed, communication performance on a signaling path of the base station 200 of the small cell is measured. In the example of FIG. 7, the cooperation manager 100 transmits a performance measurement request to a P-GW (or an S-GW) (Step S110). In response to the performance measurement request from the cooperation manager 100, the P-GW measures communication performance on the signaling path of the base station 200 of the small cell (Step S120). Then, the P-GW informs the cooperation manager 100 of a value of a communication performance parameter indicating throughput and latency of each bearer as a measurement target, for example (Step S130).

When the communication performance parameter is acquired, the cooperation manager 100 selects an interference control scheme based on the acquired communication performance parameter (Step S140). Then, the cooperation manager 100 transmits interference control signals to the base station of the small cell 200 and the base station of the macro cell in accordance with the selected interference control scheme (Step S150). In this manner, the interference is suppressed between the base station 200 of the small cell and the base station of the macro cell in accordance with the interference control scheme selected by the cooperation manager 100.

Thereafter, the measurement of communication performance and the interference control can be repeated periodically or based on a request.

(2) Performance Measurement Processing

Figure 8:
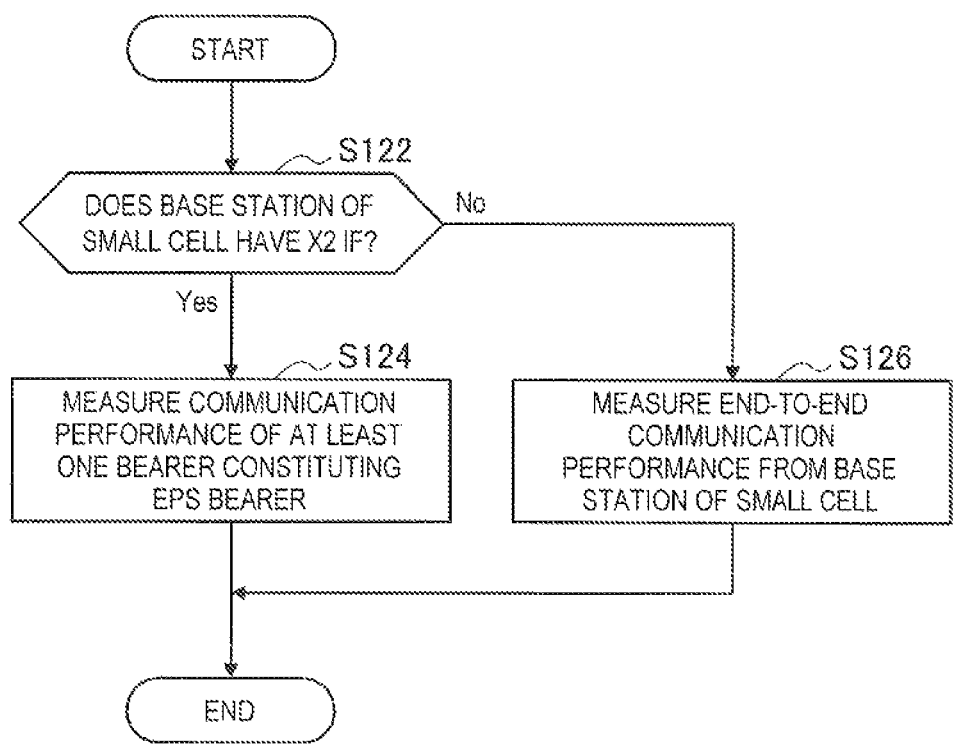
FIG. 8 is a flowchart illustrating an example of a flow of performance measurement processing according to the first embodiment.

FIG. 8 is a flowchart illustrating an example of a flow of the performance measurement processing performed at Step S120 in FIG. 7. In the example of FIG. 8, it is determined first whether the base station 200 of a small cell has an X2 interface (Step S122). When it is determined here that the base station 200 of the small cell has an X2 interface, communication performance is measured regarding at least one bearer constituting an EPS bearer (Step S124). By contrast, when it is determined that the base station 200 of the small cell does not have an X2 interface, communication performance is measured in an end-to-end manner (Step S126).

(3) Interference Control Scheme Selection Processing

Figure 9:
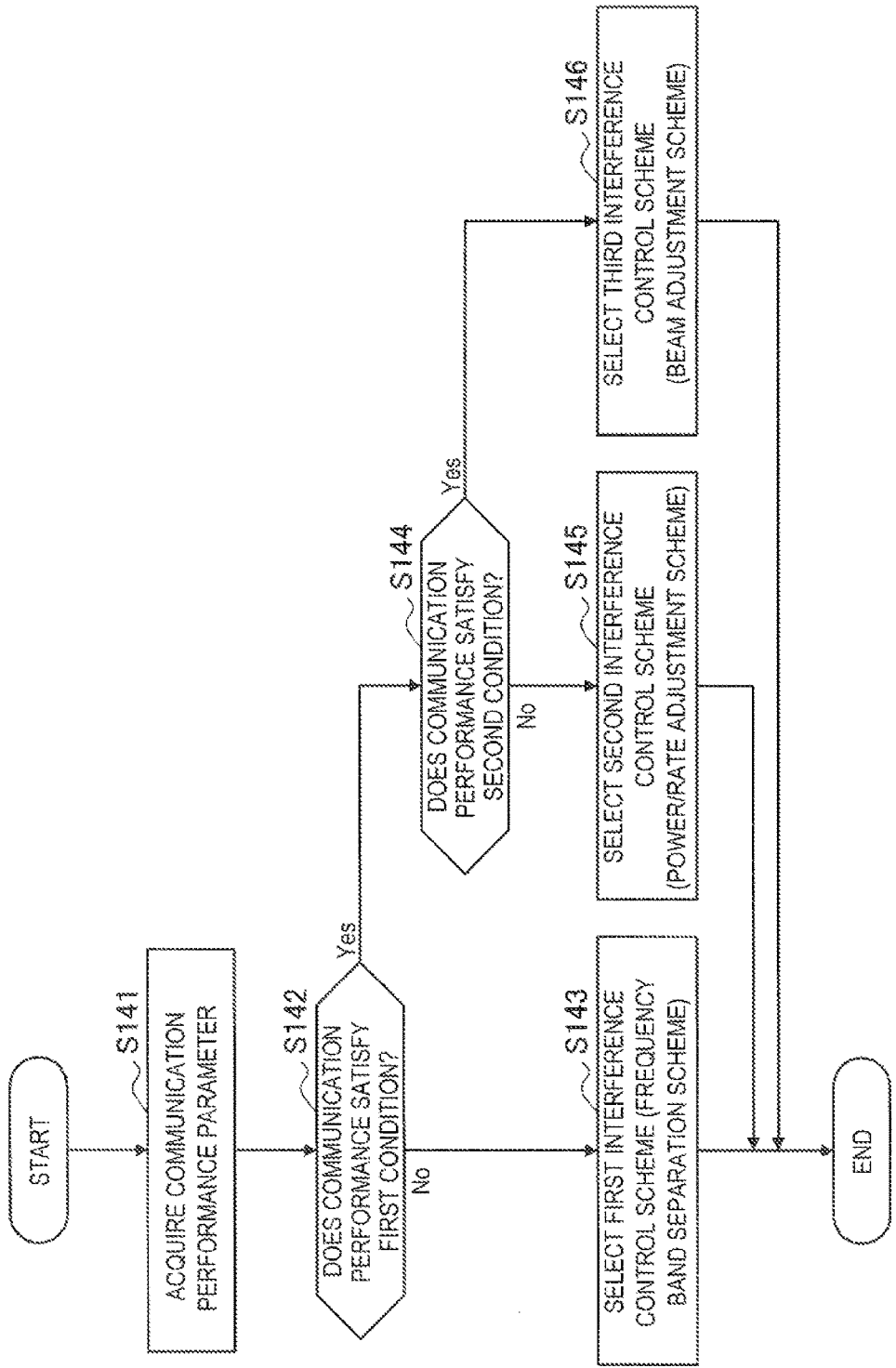
FIG. 9 is a flowchart illustrating an example of a flow of interference control scheme selection processing according to the first embodiment.

FIG. 9 is a flowchart illustrating an example of a flow of the interference control scheme selection processing performed at Step S140 in FIG. 7. In the example of FIG. 9, the performance acquisition unit 132 of the cooperation manager 100 acquires a communication performance parameter indicating communication performance on a signaling path of the base station 200 of the small cell (Step S141).

Next, the selection unit 134 determines whether the communication performance indicated by the communication performance parameter satisfies the first condition (Step S142). The first condition may be a condition that the throughput is higher than a first throughput threshold, and the latency is smaller than a first latency threshold (the comparison with a threshold regarding one of them may be omitted). Here, when it is determined that the communication performance does not satisfy the first condition, the selection unit 134 selects the first interference control scheme (frequency band separation scheme) (Step S143).

When it is determined at Step S142 that the communication performance satisfies the first condition, the selection unit 134 further determines whether the communication performance satisfies the second condition (Step S144). The second condition is a severer condition than the first condition, and may be a condition that the throughput is higher than a second throughput threshold, and the latency is smaller than a second latency threshold (the comparison with a threshold regarding one of them may be omitted). Here, when it is determined that the communication performance does not satisfy the second condition, the selection unit 134 selects the second interference control scheme (power/rate adjustment scheme) (Step S145). By contrast, when it is determined that the communication performance satisfies the severer second condition, the selection unit 134 selects the third interference control scheme (beam adjustment scheme) (Step S146).

3. SECOND EMBODIMENT

3-1. Deployment of Interface for Interference Control

The problem of communication performance for interference control signaling can be solved by deploying, in a base station of a small cell, a high-speed interface with a cooperation manager. The interface for interference control may be deployed by newly arranging a physical communication line such as optical fiber. Alternatively, the interface for interference control may be deployed as a logical interface on an existing communication line (a GTP tunnel or a VPN (Virtual Private Network), etc., for example). The interface for interference control may be a dedicated interface for signaling for interference control or an interface used also for signaling for another purpose.

FIG. 10A to FIG. 10E illustrate examples of the interface for interference control in each of arrangement of cooperation managers exemplified in FIG. 4A to FIG. 4E, respectively.

In the example of FIG. 10A, the interface for interference control can be deployed between the cooperation manager arranged as a new control node and each base station of a small cell.

Figure 10B:
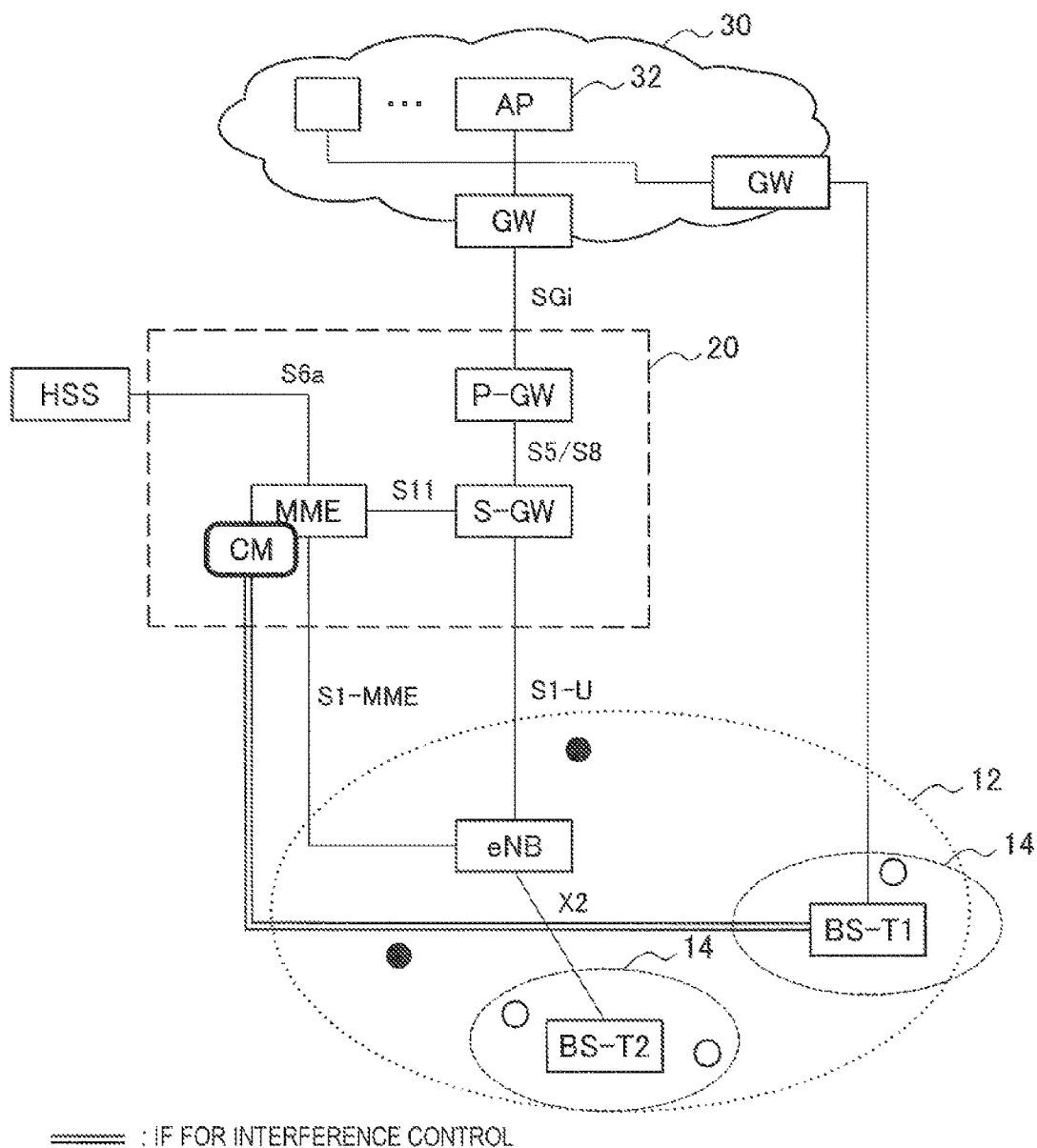
FIG. 10B is an explanatory diagram for explaining a second example of the interface for interference control.

In the example of FIG. 10B, the interface for interference control can be deployed between the cooperation manager arranged on the MME and the type-1 base station. The type-2 base station can perform communication with the cooperation manager through an X2 interface and an S1-MME interface.

Figure 10C:
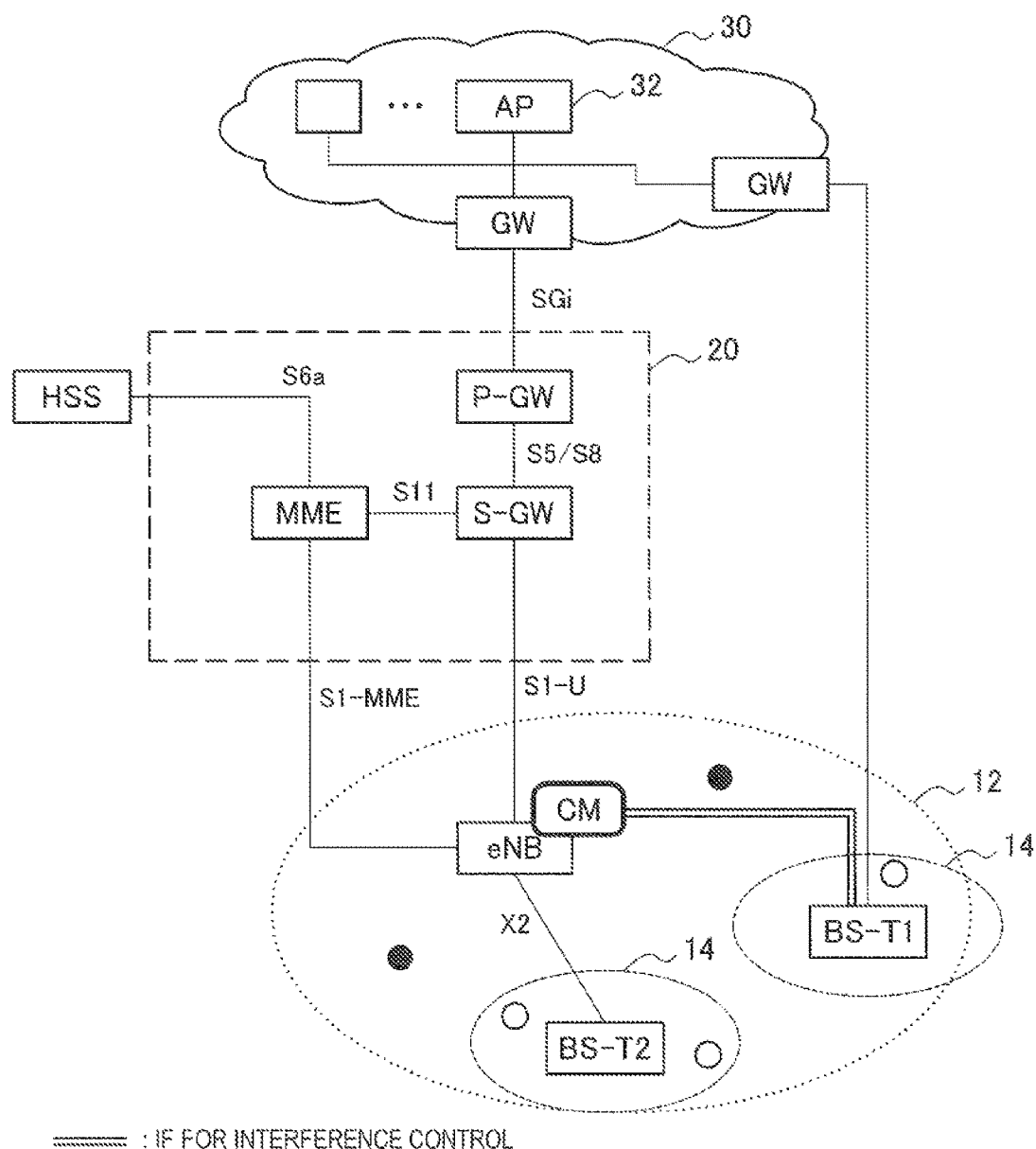
FIG. 10C is an explanatory diagram for explaining a third example of the interface for interference control.

In the example of FIG. 10C, the interface for interference control can be deployed between the cooperation manager arranged on the eNB and the type-1 base station. The type-2 base station can perform communication with the cooperation manager through an X2 interface.

Figure 10D:
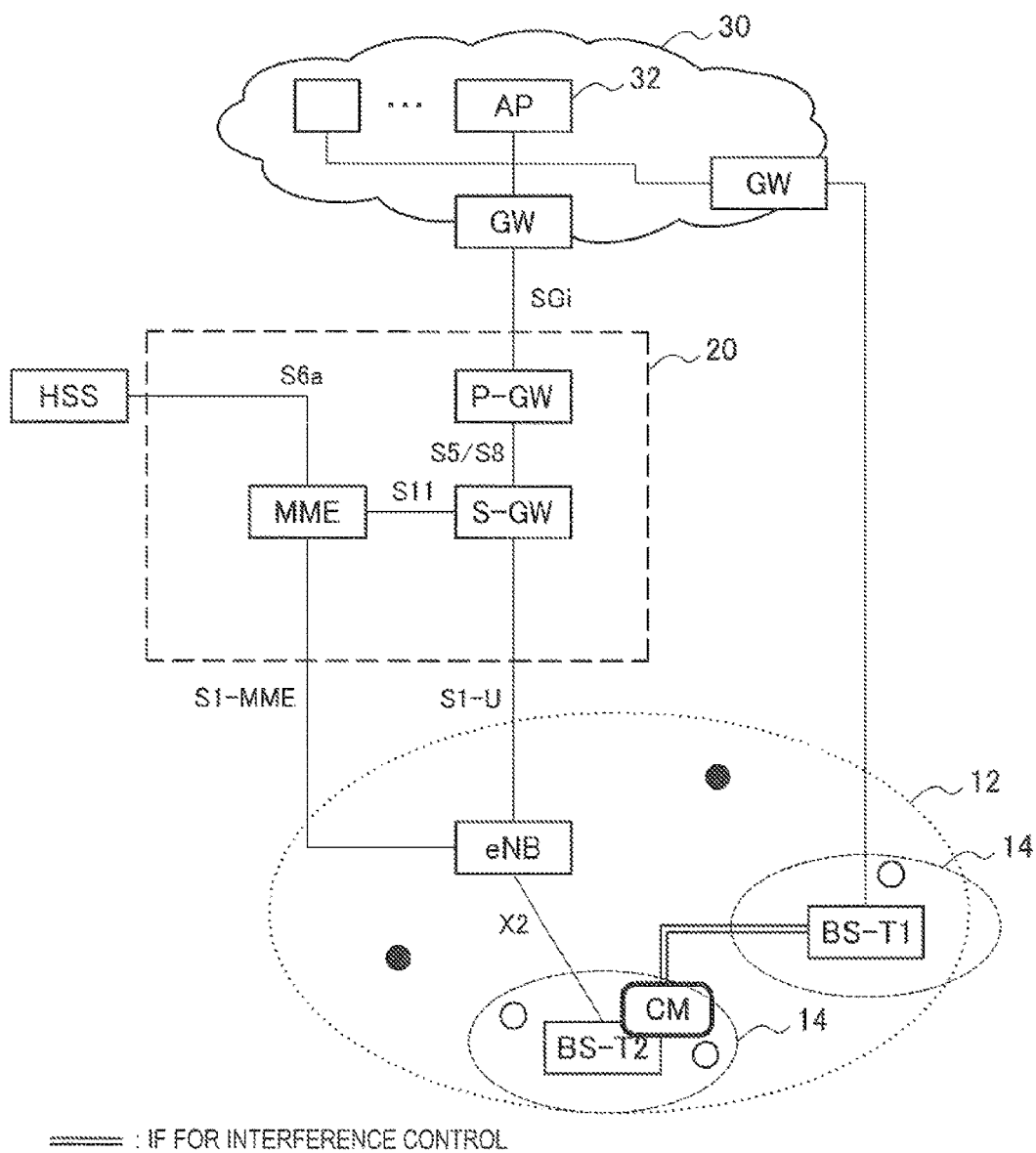
FIG. 10D is an explanatory diagram for explaining a fourth example of the interface for interference control.

In the example of FIG. 10D, the interface for interference control can be deployed between the base station of a small cell on which the cooperation manager is arranged and another base station of a small cell.

Figure 10E:
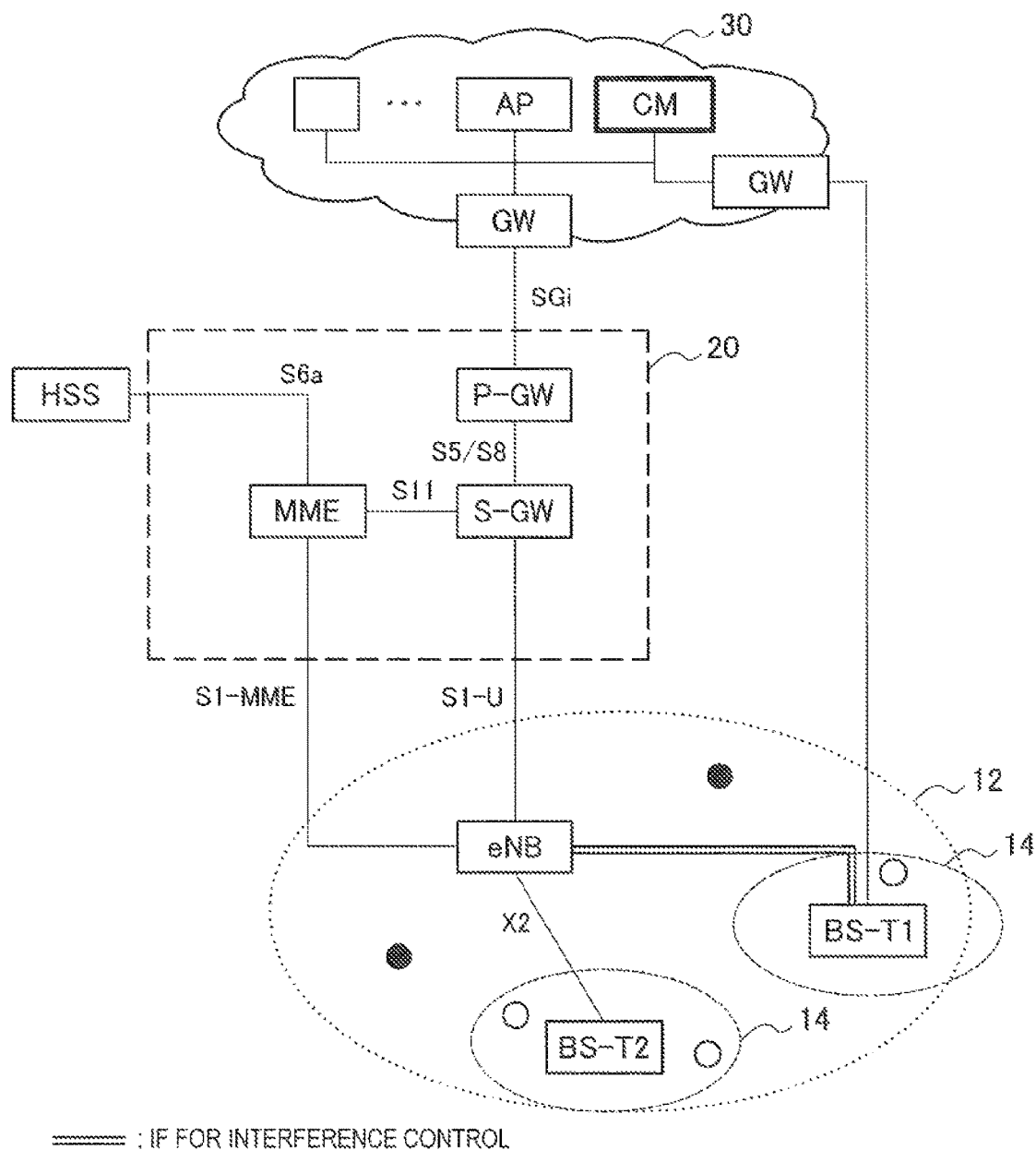
FIG. 10E is an explanatory diagram for explaining a fifth example of the interface for interference control.

In the example of FIG. 10E, the interface for interference control can be deployed between the eNB and the type-1 base station. The type-2 base station can perform communication with the eNB through an X2 interface. The eNB can perform communication with the cooperation manager through an S1-U interface, an S5/S8 interface, and an SGi interface.

When the interface for interference control exemplified in FIG. 10A to FIG. 10E is deployed, it is assumed that sufficient communication performance can be obtained between the base station of a small cell and the cooperation manager. Therefore, communication performance is not measured again regarding such a small cell, and any of preliminarily defined effective interference control schemes may be selected. By contrast, regarding a base station of a small cell in which the interface for interference control is not deployed, it is effective to select an interference control scheme in accordance with communication performance, as described in the first embodiment. Then, the cooperation manager according to the second embodiment described in the following switches modes between a mode for fixedly selecting an interference control scheme and a mode for dynamically selecting an interference control scheme in accordance with communication performance, depending on whether a base station of a small cell has an interface for interference control.

3-2. Configuration Example of Cooperation Manager

Figure 11:
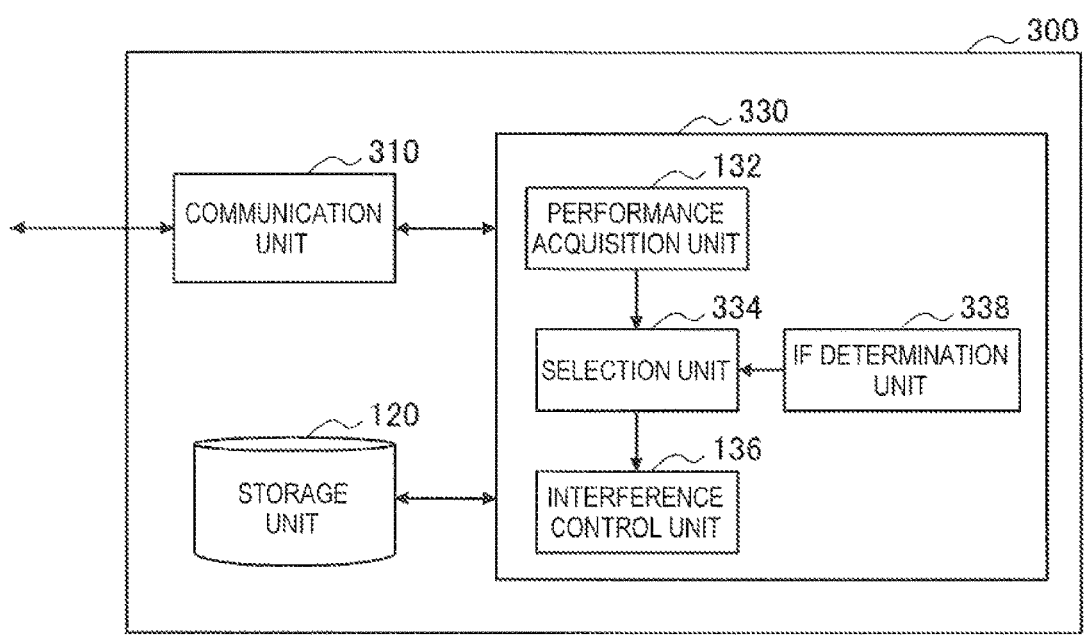
FIG. 11 is a block diagram illustrating an example of a configuration of the cooperation manager according to a second embodiment.

FIG. 11 is a block diagram illustrating an example of a configuration of a cooperation manager 300 according to a second embodiment. With reference to FIG. 11, the cooperation manager 300 includes a communication unit 310, the storage unit 120, and a controller 330.

(1) Communication Unit

The communication unit 310 is a communication module for communication of the cooperation manager 300 with other nodes. The communication unit 310 may include a wireless communication module, or may include a wired communication module. In the embodiment, the communication unit 310 can also terminate an interface for interference with a base station of a small cell.

(2) Controller

The controller 330 corresponds to a processor such as a CPU or a DSP. The controller 330 operates various functions of the cooperation manager 300 by executing programs stored in the storage unit 120 or other storing media. In the embodiment, the controller 330 includes four function modules of the performance acquisition unit 132, a selection unit 334, the interference control unit 136, and an IF determination unit 338.

(2-1) IF Determination Unit

The IF determination unit 338 determines whether a base station of a small cell specified as a target of interference control has a logical or physical communication interface for interference control. Then, the IF determination unit 338 outputs a result of determination to the selection unit 334. The determination by the IF determination unit 338 may be performed based on identification information or capability information, for example, of the base station of the small cell acquired in the initial setup exemplified in FIG. 7, for example.

(2-2) Selection Unit

When the IF determination unit 338 determines that the base station of the small cell has an interface for interference control, the selection unit 334 selects a preliminarily defined interference control scheme for interference control of the base station of the small cell. The interference control scheme selected here may be the above-described second interference control scheme or the third interference control scheme, or another arbitrary scheme effective for interference control. By contrast, when the IF determination unit 338 determines that the base station of the small cell does not have an interface for interference control, the selection unit 334 selects an interference control scheme based on a communication performance parameter acquired by the performance acquisition unit 132, similarly to the selection unit 134 according to the first embodiment. The candidate for an interference control scheme to be selected by the selection unit 334 may be the first to third interference control schemes described above, for example. The selection unit 334 outputs an identifier identifying the selected interference control scheme to the interference control unit 136. Then, the interference control unit 136 performs cooperative interference control between the macro cell and the small cell in accordance with the interference control scheme selected by the selection unit 334.

3-3. Processing Flow

Figure 12:
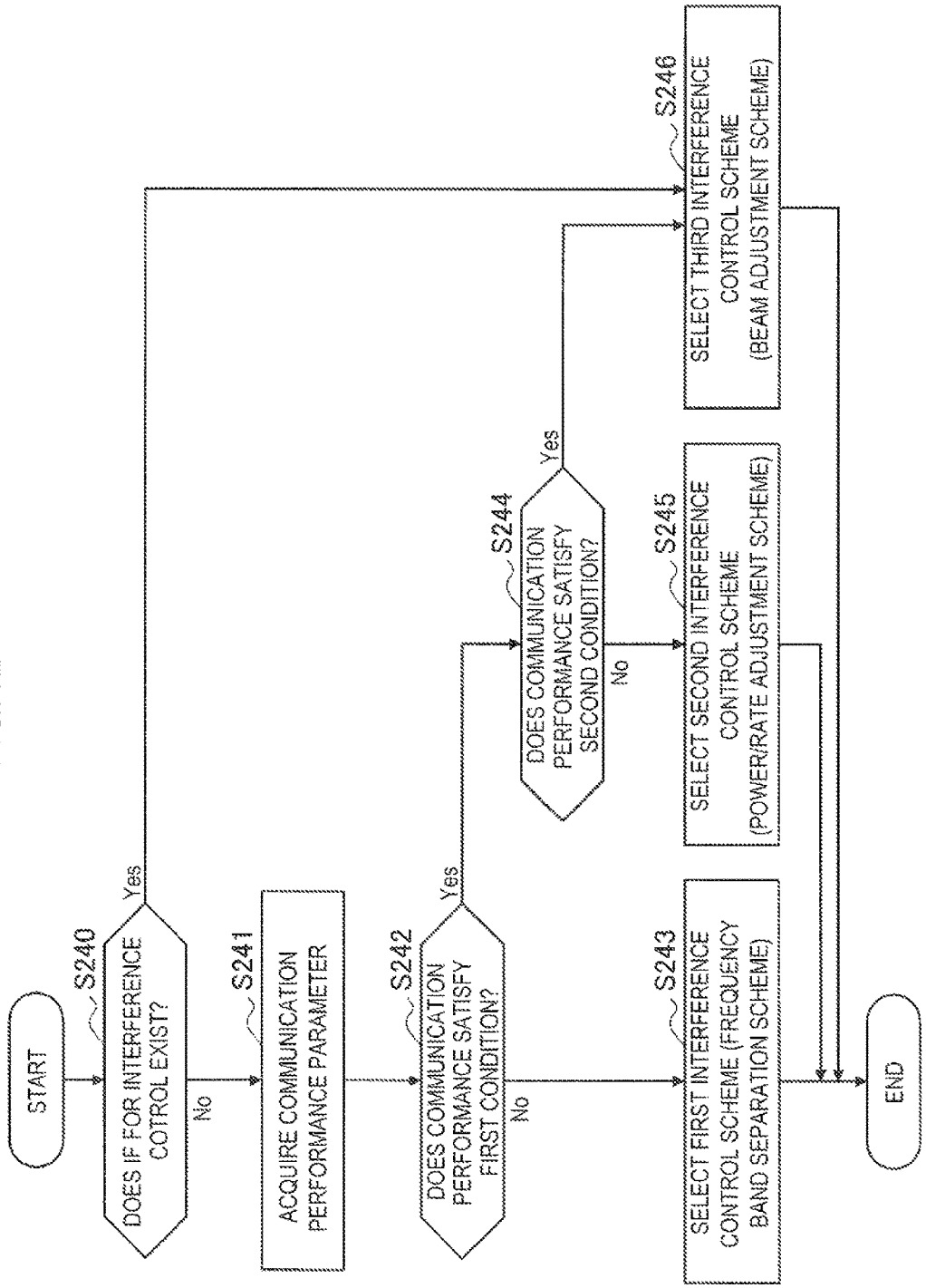
FIG. 12 is a flowchart illustrating an example of a flow of interference control scheme selection processing according to the second embodiment.

FIG. 12 is a flowchart illustrating an example of a flow of interference control scheme selection processing according to the second embodiment.

In the example of FIG. 12, the IF determination unit 338 of the cooperation manager 300 first determines whether a base station of a small cell has an interface for interference control (Step S240). When it is determined that the base station of the small cell has an interface for interference control, the processing proceeds to Step S246. By contrast, when it is determined that the base station of the small cell does not have an interface for interference control, the processing proceeds to Step S241.

At Step S241, the performance acquisition unit 132 acquires a communication performance parameter indicating communication performance on a signaling path of the base station of the small cell (Step S241).

Next, the selection unit 334 determines whether the communication performance indicated by the communication performance parameter satisfies the first condition (Step S242). Here, when it is determined that the communication performance does not satisfy the first condition, the selection unit 334 selects the first interference control scheme (frequency band separation scheme) (Step S243).

When it is determined at Step S242 that the communication performance satisfies the first condition, the selection unit 334 further determines whether the communication performance satisfies the second condition (Step S244). The second condition is a severer condition than the first condition. Here, when it is determined that the communication performance does not satisfy the second condition, the selection unit 334 selects the second interference control scheme (power/rate adjustment scheme) (Step S245).

By contrast, when it is determined that the communication performance satisfies the second condition, or when the base station of the small cell has an interface for interference control, the selection unit 334 selects the third interference control scheme (beam adjustment scheme) (Step S246).

Note that also in the embodiment, the cooperation manager 300 may select an interference control scheme different from the first to third interference control schemes. Moreover, it is also possible to select an interference control scheme using the combination of two or more of the first to third interference control schemes.

4. CONCLUSION

The two embodiments of the technique according to the present disclosure have been described in detail using FIG. 5 to FIG. 12. According to the embodiments described above, an interference control scheme for controlling interference between a macro cell and a small cell is selected based on communication performance on a signaling path of a base station of the small cell. This enables flexible switching of schemes in the manner that a simpler interference control scheme is selected when communication performance is not sufficient, and a closer interference control scheme is selected when sufficient communication performance can be obtained. Therefore, no matter how the small cell is arranged, it is possible to maintain preferable communication quality using an optimal interference control scheme and increase communication capacity. Moreover, no matter where the cooperation manager is positioned in network architecture, it is possible to select an optimal interference control scheme.

For example, when the communication performance parameter indicates that communication performance is higher, the interference control scheme requiring larger signaling overhead can be selected. When the communication performance is high, it is possible to transmit large signaling overhead at a high-speed and with small delay. Therefore, in this case, it is possible, with the use of the interference control scheme based on closer signaling, to effectively suppress interference using frequency resources efficiently.

Moreover, when the communication performance parameter indicates that communication performance is lower, the interference control scheme having higher resistance to latency can be selected. When the communication performance is low, the interference control scheme requiring immediacy does not operate appropriately. Therefore, in this case, it is effective to securely suppress interference using the interference control scheme having high resistance to latency (frequency separation scheme, for example).

Furthermore, according to the second embodiment, when a base station of a small cell does not have an interface for interference control, an interference control scheme can be selected based on a communication performance parameter. Therefore, it is possible to use, when an interface for interference control exists, an interference control scheme high in resource efficiency utilizing the interface, and use, when an interface for interference control does not exist, an appropriate interference control scheme in accordance with communication performance.

Note that the sequence of control processing by each device described in the description may be achieved using any of software, hardware, and the combination of software and hardware. A program constituting software is preliminarily stored in a storing medium provided inside or outside of each device, for example. Then, each program is read in a RAM when executed, and executed by a processor such as a CPU.

The preferred embodiments of the present disclosure have been described above with reference to the accompanying drawings, whilst the technical scope of the disclosure is not limited to the above examples. It is clear that a person skilled in the art can find various alteration examples and modification examples within the technical idea described in the claims, and it should be understood that they will naturally come under the technical scope of the present disclosure.

Additionally, the present technology may also be configured as below.

(1)

A communication control device including:

a performance acquisition unit that acquires a parameter indicating communication performance on a signaling path of a base station of a small cell that at least partially overlaps with a macro cell in a wireless communication system;

a selection unit that selects an interference control scheme for controlling interference between the macro cell and the small cell, based on the parameter acquired by the performance acquisition unit; and an interference control unit that transmits an interference control signal to the base station of the small cell in accordance with the interference control scheme selected by the selection unit.

(2)

The communication control device according to (1), wherein the selection unit selects the interference control scheme requiring larger signaling overhead when the parameter indicates that the communication performance is higher.

(3)

The communication control device according to (1), wherein the selection unit selects the interference control scheme having higher resistance to latency when the parameter indicates that the communication performance is lower.

(4)

The communication control device according to any one of (1) to (3), wherein the selection unit selects the interference control scheme based on the parameter when the base station of the small cell does not have a logical or physical communication interface for interference control.

(5)

The communication control device according to any one of (1) to (4), wherein the selection unit selects, based on the parameter, the interference control scheme among candidates including two or more of a first scheme in which operating frequency bands different from each other are each allocated to the macro cell and the small cell, a second scheme in which transmission power or a transmission rate is adjusted between the macro cell and the small cell, and a third scheme in which a transmission beam or a reception beam is adjusted between the macro ell and the small cell.

(6)

The communication control device according to any one of (1) to (5), wherein the performance acquisition unit acquires, when the base station of the small cell has an X2 interface, the parameter indicating communication performance of at least one bearer constituting an EPS (Evolved Packet System) bearer on the signaling path.

(7)

The communication control device according to any one of (1) to (6), wherein the performance acquisition unit acquires, when the base station of the small cell does not have an X2 interface, the parameter indicating end-to-end communication performance on the signaling path.

(8)

The communication control device according to any one of (1) to (7), wherein the parameter includes at least one of throughput and latency.

(9)

The communication control device according to any one of (1) to (8), wherein the communication control device is positioned in a core network in the wireless communication system.

(10)

The communication control device according to any one of (1) to (8), wherein the communication control device is positioned in the macro cell.

(11)

The communication control device according to any one of (1) to (8), wherein the communication control device is positioned in an external IP network in the wireless communication system.

(12)

A communication control method including:

by a control node in a wireless communication system, acquiring a parameter indicating communication performance on a signaling path of a base station of a small cell that at least partially overlaps with a macro cell;

selecting an interference control scheme for controlling interference between the macro cell and the small cell, based on the acquired parameter; and transmitting an interference control signal to the base station of the small cell in accordance with the selected interference control scheme.

(13)

A base station of a small cell that at least partially overlaps with a macro cell in a wireless communication system, the base station including:

a communication unit that receives, from a control node controlling interference between the macro cell and the small cell, an interference control signal of an interference control scheme selected based on a parameter indicating communication performance on a signaling path between the base station of the small cell and a base station of the macro cell; and a controller that controls wireless communication between the base station of the small cell and a terminal connected to the small cell in accordance with the interference control signal received by the communication unit.

(14)
A communication control system including:
a base station of a small cell that at least partially overlaps with a macro cell in a wireless communication system; and
a control node including
a performance acquisition unit that acquires a parameter indicating communication performance on a signaling path of the base station of the small cell,
a selection unit that selects an interference control scheme for controlling interference between the macro cell and the small cell, based on the parameter acquired by the performance acquisition unit, and
an interference control unit that transmits an interference control signal to the base station of the small cell in accordance with the interference control scheme selected by the selection unit.

REFERENCE SIGNS LIST 100, 300 cooperation manager (communication control device)
132 performance acquisition unit
134, 334 selection unit
136 interference control unit
338 IF determination unit
200 base station
220 communication unit
240 controller

The invention claimed is:

1. A communication control device, comprising:
circuitry configured to:
determine that a first base station of a small cell is one of a Type 1 base station that has a first interface other than an X2 interface or a Type 2 base station that has a second interface as the X2 interface, wherein the small cell at least partially overlaps with a macro cell in a wireless communication system;
acquire a first parameter based on the determination that the first base station is the Type 1 base station, wherein the first parameter indicates communication performance on a signaling path of the first base station in an end-to-end manner between the first base station and a second base station of the macro cell;
acquire a second parameter based on the determination that the first base station is the Type 2 base station, wherein the second parameter indicates the communication performance with respect to at least one Evolved Packet System (EPS) bearer on the signaling path;
set an interference control scheme to control interference between the macro cell and the small cell, based on one of the first parameter or the second parameter; and
transmit an interference control signal to the first base station of the small cell, based on the set interference control scheme.

2. The communication control device according to claim 1, wherein the circuitry is further configured to set the interference control scheme, associated with a signaling overhead larger than a signaling overhead threshold, based on one of the first parameter or the second parameter that indicates that the communication performance is higher than a communication performance threshold.

3. The communication control device according to claim 1, wherein the circuitry is further configured to set the interference control scheme, which has a resistance to latency higher than a resistance threshold, based on one of the first parameter or the second parameter that indicates that the communication performance is lower than a communication performance threshold.

4. The communication control device according to claim 1, wherein the circuitry is further configured to set the interference control scheme based on one of the first parameter or the second parameter for the first base station of the small cell that lacks at least one of a logical or physical communication interface for interference control.

5. The communication control device according to claim 1, wherein the interference control scheme includes at least two of:
a first scheme in which a different operating frequency band is allocated to each of the macro cell and the small cell,
a second scheme in which at least one of a transmission power or a transmission rate is adjusted between the macro cell and the small cell, or
a third scheme in which at least one of a transmission beam or a reception beam is adjusted between the macro cell and the small cell.

6. The communication control device according to claim 1, wherein one of the first parameter or the second parameter includes at least one of throughput or latency.

7. The communication control device according to claim 1, wherein the communication control device is in a core network in the wireless communication system.

8. The communication control device according to claim 1, wherein the communication control device is in the macro cell.

9. The communication control device according to claim 1, wherein the communication control device is in an external IP network in the wireless communication system.

10. The communication control device according to claim 1, wherein the circuitry is further configured to acquire one of the first parameter or the second parameter periodically in a fixed cycle.

11. The communication control device according to claim 1, wherein the circuitry is further configured to acquire one of the first parameter or the second parameter based on a determination that an interference level of a user terminal exceeds a threshold.

12. A communication control method, comprising:
in a control node of a wireless communication system,
determining that a first base station of a small cell is one of a Type 1 base station that has a first interface other than an X2 interface or a Type 2 base station that has a second interface as the X2 interface, wherein the small cell is at least partially overlapped with a macro cell in the wireless communication system;
determining a first parameter based on the determination that the first base station is the Type 1 base station, wherein the first parameter indicates communication performance on a signaling path of the first base station in an end-to-end manner between the first base station and a second base station of the macro cell;
acquiring a second parameter based on the determination that the first base station is the Type 2 base station, wherein the second parameter indicates the communication performance with respect to at least one Evolved Packet System (EPS) bearer on the signaling path;
setting an interference control scheme for controlling interference between the macro cell and the small cell, based on one of the first parameter or the second parameter; and transmitting an interference control signal to the first base station of the small cell based on the set interference control scheme.

13. A first base station of a small cell, the first base station comprising:
  circuitry configured to:
    receive, from a control node, an interference control signal of an interference control scheme to control interference between a macro cell and the small cell,
      wherein the interference control scheme is set based on one of a first parameter or a second parameter that indicates communication performance on a signaling path between the first base station and a second base station of the macro cell,
      wherein the first parameter is acquired based on a determination that the first base station is a Type 1 base station, wherein the first parameter indicates the communication performance in an end-to-end manner between the first base station and the second base station of the macro cell,
      wherein the second parameter is acquired based on the determination that the first base station is a Type 2 base station, and wherein the second parameter indicates the communication performance with respect to at least one Evolved Packet System (EPS) bearer on the signaling path, and
      wherein the Type 1 base station has a first interface other than an X2 interface, and the Type 2 base station has a second interface as the X2 interface; and
    control wireless communication between the first base station and a terminal device connected to the small cell, based on the received interference control signal.

14. A communication control system, comprising:
  a first base station of a small cell that at least partially overlaps with a macro cell in a wireless communication system; and
  a control node that includes circuitry configured to:
    determine that the first base station is one of a Type 1 base station that has a first interface other than an X2 interface or a Type 2 base station that has a second interface as the X2 interface;
    acquire a first parameter based on the determination that the first base station is the Type 1 base station, wherein the first parameter indicates communication performance on a signaling path of the first base station in an end-to-end manner between the first base station and a second base station of the macro cell;
    acquire a second parameter based on the determination that the first base station is the Type 2 base station, wherein the second parameter indicates the communication performance with respect to at least one Evolved Packet System (EPS) bearer on the signaling path;
    set an interference control scheme to control interference between the macro cell and the small cell, based on one of the first parameter or the second parameter; and
    transmit an interference control signal to the first base station, based on the set interference control scheme.

* * * * *